(12) United States Patent
Nakasu et al.

(10) Patent No.: US 10,296,096 B2
(45) Date of Patent: May 21, 2019

(54) OPERATION RECOGNITION DEVICE AND OPERATION RECOGNITION METHOD

(71) Applicant: KABUSHIKI KAISHA TOSHIBA, Minato-ku, Tokyo (JP)

(72) Inventors: Toshiaki Nakasu, Tokyo (JP); Tsukasa Ike, Tokyo (JP); Yasunobu Yamauchi, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 158 days.

(21) Appl. No.: 15/208,289

(22) Filed: Jul. 12, 2016

(65) Prior Publication Data
US 2017/0017303 A1    Jan. 19, 2017

(30) Foreign Application Priority Data

Jul. 15, 2015 (JP) ................................ 2015-141458

(51) Int. Cl.
*G06F 3/01* (2006.01)
*G06F 3/0346* (2013.01)

(52) U.S. Cl.
CPC ............ *G06F 3/017* (2013.01); *G06F 3/0346* (2013.01); *G06F 2203/0331* (2013.01)

(58) Field of Classification Search
CPC . G06F 2203/0331; G06F 3/017; G06F 3/0346
See application file for complete search history.

(56) References Cited

U.S. PATENT DOCUMENTS

| 5,594,469 A | 1/1997 | Freeman et al. |
| 7,038,658 B2 | 5/2006 | Seki et al. |
| 7,427,979 B2 | 9/2008 | Park et al. |
| 8,325,214 B2 | 12/2012 | Hildreth |

(Continued)

FOREIGN PATENT DOCUMENTS

| JP | H 07-152870 A | 6/1995 |
| JP | H 07-271506 | 10/1995 |

(Continued)

OTHER PUBLICATIONS

Madgwick, S., et al., "Estimation of IMU and MARG Orientation Using a Gradient Descent Algorithm", 2011 IEEE International Conference on Rehabilitation Robotics, Jun. 2011, 7 pgs.

(Continued)

*Primary Examiner* — Viet D Pham
(74) *Attorney, Agent, or Firm* — Knobbe, Martens, Olson & Bear, LLP

(57) ABSTRACT

According to one embodiment, there is provided an operation recognition device comprising a computer including a hardware processor. The hardware processor is configured to acquire movement information associated with a movement of a user, and area information corresponding to a first operation section; determine, based at least in part on the movement information and the area information corresponding to the first operation section, an estimated position corresponding to a subsequent operation by the user; and determine whether the subsequent operation by the user is directed to the first operation section based at least in part on the estimated position corresponding to the subsequent operation.

21 Claims, 20 Drawing Sheets

(56) References Cited

U.S. PATENT DOCUMENTS

| | | |
|---|---|---|
| 8,803,832 B2 | 8/2014 | Ohashi et al. |
| 8,965,113 B2 | 2/2015 | Nakasu et al. |
| 9,262,076 B2 | 2/2016 | Townsend et al. |
| 2010/0066664 A1 | 3/2010 | Son et al. |
| 2010/0219989 A1 | 9/2010 | Asami et al. |
| 2011/0161888 A1 | 6/2011 | Ito et al. |
| 2012/0019485 A1 | 1/2012 | Sato et al. |
| 2012/0105613 A1* | 5/2012 | Weng ............ G01C 21/3664 348/77 |
| 2012/0317516 A1 | 12/2012 | Ohsumi |
| 2013/0069867 A1* | 3/2013 | Watanabe ............ G06F 3/017 345/156 |
| 2015/0138075 A1 | 5/2015 | Nakasu et al. |
| 2016/0077608 A1 | 3/2016 | Nakasu et al. |
| 2016/0139675 A1 | 5/2016 | Nakasu et al. |

FOREIGN PATENT DOCUMENTS

| | | |
|---|---|---|
| JP | H08-315154 A | 11/1996 |
| JP | H08-328645 A | 12/1996 |
| JP | 2004-054390 | 2/2004 |
| JP | 2004-258837 A | 9/2004 |
| JP | 2007-130367 A | 5/2007 |
| JP | 2007-194958 | 8/2007 |
| JP | 4474529 B2 | 6/2010 |
| JP | 2010-541398 A | 12/2010 |
| JP | 2011-118629 A | 6/2011 |
| JP | 2012-089083 A | 5/2012 |
| JP | 2012-146220 A | 8/2012 |
| JP | 2013-030134 | 2/2013 |
| JP | 2013-175113 | 9/2013 |
| JP | 2014-063318 A | 4/2014 |
| JP | 2014-526822 A | 10/2014 |
| JP | 2015-099574 | 5/2015 |
| JP | 2016-062274 A | 4/2016 |
| JP | 2016-095795 A | 5/2016 |

OTHER PUBLICATIONS

Extended European Search Report dated Mar. 15, 2016 in corresponding European Application No. 15183780.4-1972, 8 pgs.

* cited by examiner

OPERATION RECOGNITION DEVICE AND OPERATION RECOGNITION METHOD

CROSS-REFERENCE TO RELATED APPLICATIONS

This application is based upon and claims the benefit of priority from Japanese Patent Application No. 2015-141458, filed Jul. 15, 2015; the entire contents of which are incorporated herein by reference.

FIELD

Embodiments described herein relate to an operation recognition device and an operation recognition method.

BACKGROUND

In the course of maintenance and inspection operations of a power control panel and the like, an inspection operator operates inspection target devices installed at relevant sites in accordance with prescribed inspection items. The inspection operator can perform correct operations by complying with a procedure manual that describes the content of the inspection operations associated with the individual inspection items of the individual inspection target devices.

However, multiple buttons and switches may be provided on the inspection target devices, and an inspection operator who is unfamiliar with the inspection operation may erroneously read the procedure manual and misunderstand the operation section or the content of the operation. In order not to overlook such an error in the inspection operation, systems are known in which a view of the inspection operation captured by a camera or the like is monitored by an administrator from a monitoring room and methods are also known according to which the states of the device before and after the operation are compared with each other and whether the correct operation has been performed is automatically determined. However, these methods are only capable of recognizing an error in an operation after the operation has been performed.

DETAILED DESCRIPTION

According to one embodiment, there is provided an operation recognition device comprising a computer including a hardware processor. The hardware processor is configured to acquire movement information associated with a movement of a user, and area information corresponding to a first operation section; determine, based at least in part on the movement information and the area information corresponding to the first operation section, an estimated position corresponding to a subsequent operation by the user; and determine whether the subsequent operation by the user is directed to the first operation section based at least in part on the estimated position corresponding to the subsequent operation.

Below, embodiments are described with reference to the drawings.

(First Embodiment)

Figure 1:
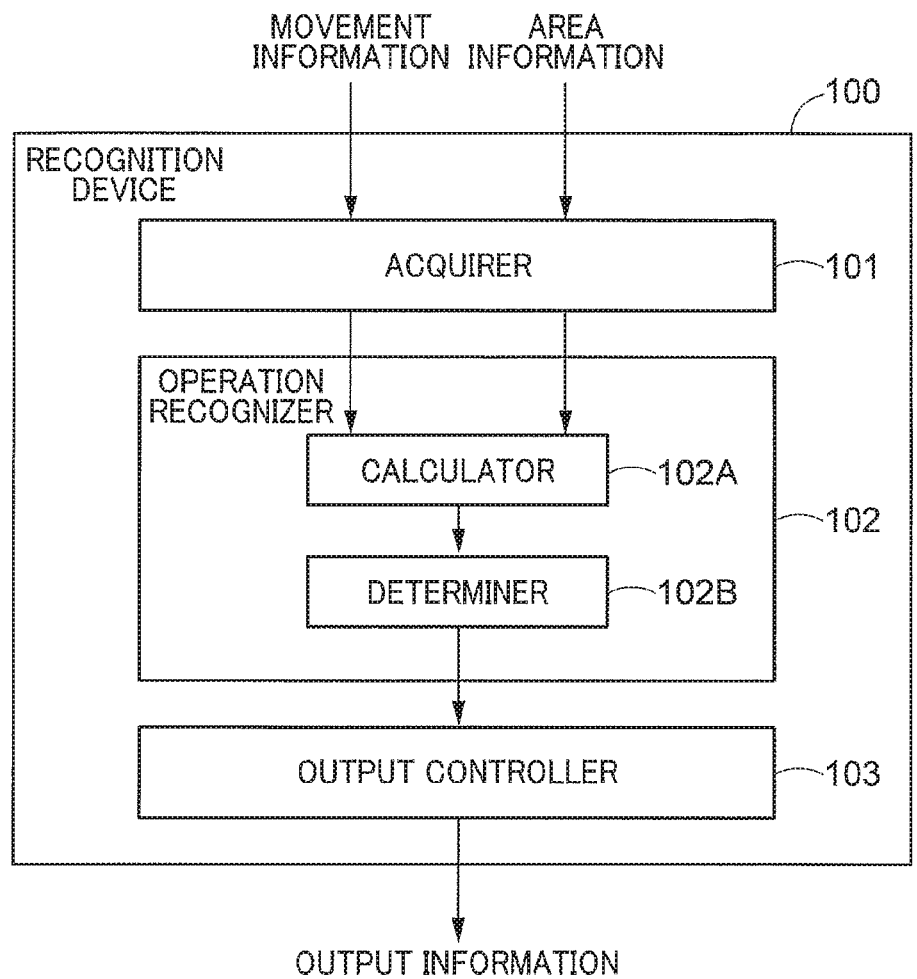
FIG. 1 is a block diagram illustrating an example of the schematic configuration of the operation recognition device in accordance with a first embodiment.

FIG. 1 is a block diagram illustrating an example of the schematic configuration of an operation recognition device 100 in accordance with a first embodiment. The operation recognition device 100 in accordance with the first embodiment includes an acquirer 101, an operation recognizer 102, and an output controller 103.

The operation recognition device 100 in accordance with the first embodiment is configured to acquire a movement of a user who performs an operation for an operation target; estimate a position of an operation that the user attempts to perform; determine whether the estimated position corresponds to the correct operation section; and determine the correctness of the operation by the user. When it is determined that the user will erroneously perform the operation, an error in the operation can be prevented by providing a warning or the like before the user performs the operation. Here, the "movement of the user" as used herein refers to an action of performing an operation for an operation target. For example, when an acceleration sensor is used, accelerations vary depending upon the operations by the user, so that it is possible to detect the actions by the user using the accelerations. In addition, the position of the user's hand or finger(s) may be detected by a camera or the like.

The specific units are described below.

The acquirer is configured to acquire area information associated with an operation target (hereinafter referred to as the "area information") and movement information on the movement of the user (hereinafter referred to as the "movement information"). The area information and the movement information are used in processing by the operation recognizer 102. The information acquired by the acquirer is not limited to the above information, but information other than the above, for example, instructions from an administrator and image information may be acquired.

Figure 2:
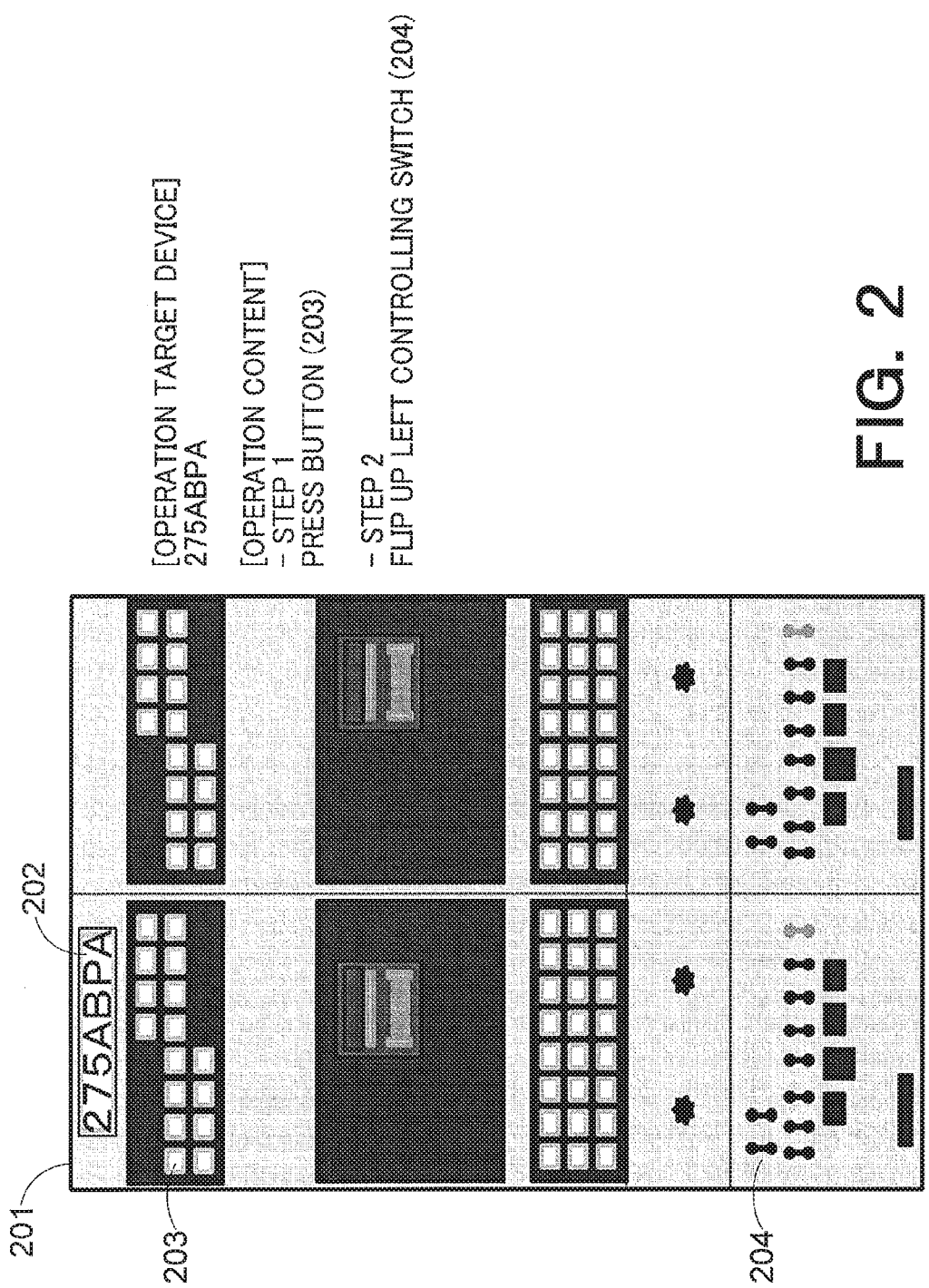
FIG. 2 is a diagram illustrating an example of an operation target.

The area information includes information associated with an "operation area" which is an area at which an operation is performed in a target for which the user performs the operation. FIG. 2 is a diagram illustrating an example of the operation target. Operation components (operation sections) including at least one of an ID for identification of the device, control buttons, switches, or meters are arranged on the operation target device 201 which is regarded as the operation target. The user performs an operation in accordance with operation items for the operation target device having an identification ID 202 described in a procedure manual or the like. A contemplated content of the operation may include, as illustrated in FIG. 2, a first operation according to which a button 203 is pressed and a second operation according to which a left control switch 204 is flipped up. It is also contemplated here that a plurality of operations are collectively referred to as one task.

The operation area may be part of the operation target, may be an area of individual operation components, and may be all of the areas of the individual operation components as a result of each operation included in one task. For example, as in the example illustrated in FIG. 2, when the button and the switch are operated in the course of one task, then the operation area may be an area acquired by combining the area of the button and the area of the switch. It may be contemplated that the operation area and the areas of the individual components may, for example, be a square-shaped area whose side is five centimeters long and whose center is a position away from the origin by 80 centimeters rightward and by one meter downward, where the left end of the operation target device is regarded as the origin.

It is also contemplated in the following explanations, unless otherwise indicated, that the area of each component to be operated is regarded as the "operation area" and the entire area of each component to be operated in accordance with each operation included in one single task is regarded as the "task area."

It is also contemplated that the operation target is not limited to the device as illustrated in FIG. 2, but may be any device associated with the operations by the user. In addition to devices such as a power distribution board on which buttons and the like are arranged, the operation target may, for example, be a device that includes a display in the form of a touch panel where buttons and the like are not provided. In addition, the operation target may be a digital signage (an electronic signboard) that does not use a touch panel and a screen on which buttons, etc. projected by a projector, etc. upon an object such as a wall are arranged.

It is contemplated here that the area information is registered in advance in a database or the like that is external to the operation recognition device 100. Meanwhile, the database may be included in the operation recognition device 100. Also, in addition to or in place of the database, the area information may be acquired by administrator's inputs, transmission from a wearable terminal or other systems.

The area information may include information other than the operation area. For example, an ID of the operation target device, the dimensions of the operation target device, components provided on the operation target device, portions at which the individual operations included in the one single task are performed, and the sequence and content of the operations may be included therein. As the content of the operations, pressing, flipping up, flipping down, twisting, etc. may be included. The content of the operation may be registered in the database in the form of texts or in the form of data indicative of moving speed information at the time of the operation or the change in the inclination of a finger.

In addition, for example, the user may have to perform a plurality of operations in a predetermined sequence, for example, the user may have to press a button first and then flip up a switch, and further turns a dial. In such a case, an operation area corresponding to the subsequent operation that the user should perform is referred to as a "correct-answer area." It is also contemplated that even when only one operation is involved, the operation area at issue is referred to as the correct-answer area. The correct-answer areas are switched from one area to another in accordance with the operations performed by the user. In the context of the preceding example, after the user pressed the button, the correct-answer area is the operation area that is associated with the operation of flipping up the switch, and after the user flipped up the switch, the correct-answer area will be the operation area that is associated with the operation of turning the dial.

The acquirer 101 may acquire the area information actively or passively. When the acquisition should be actively done, the area information may be identified from the device's ID or the like by acquiring the device ID of the operation target from the user. In addition to or in place of the device ID, the operation target may be identified by referring to an operation history indicative of the past operations on the basis of the user's ID, the ID of the device from which the movement information is acquired, etc. In addition, the area information may be acquired not from the user but from another system. For example, as such a system, a system may be contemplated that determines the position at which the user is standing by a camera installed near the operation target or an RFID (Radio Frequency Identifier).

The "movement information" as used herein refers to information indicative of an action by a user of performing an operation for an operation target, and as one example, includes information indicative of a movement associated with the whole or part of the body of the user performing the operation. The movement information is represented, by way of example and not limited to, by acceleration, angular velocity, and geomagnetism. Any measuring method may be used for measuring the movement information and thus the measuring method is not limited to any particular measuring method(s). For example, it may be measured using an acceleration sensor, an angular velocity sensor, and a geomagnetism sensor. In the following explanations, unless otherwise indicated, it is contemplated that the acceleration information is used as the movement information.

Figure 3:
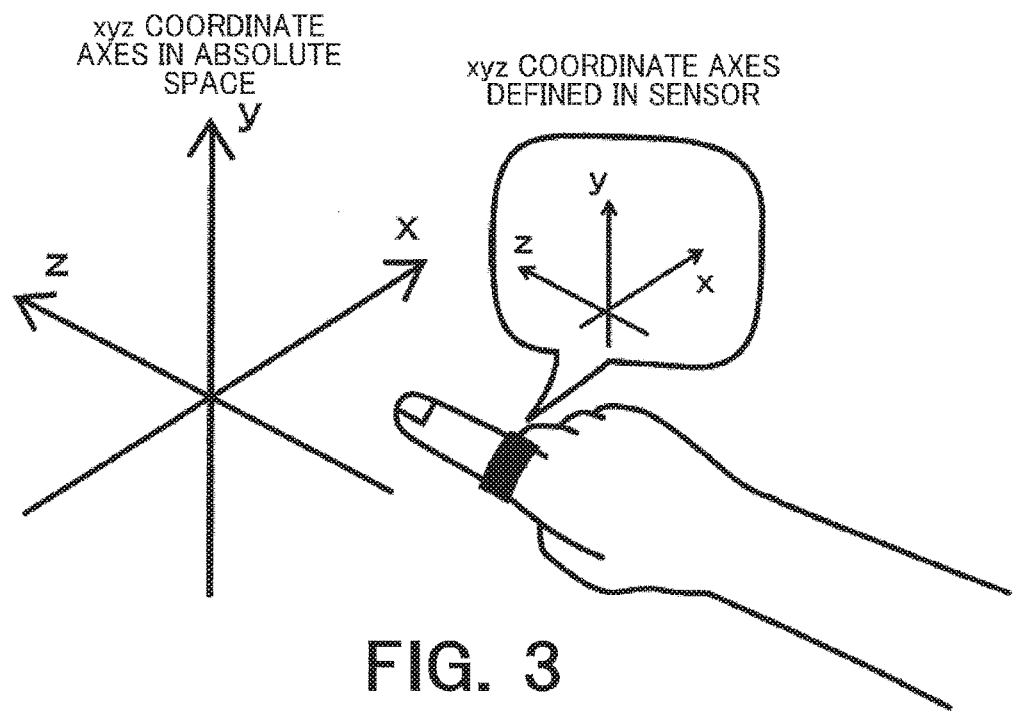
FIG. 3 is a diagram illustrating an example of a method of measurement of movement information.

FIG. 3 is a diagram illustrating an example of the measuring method for measuring the movement information. In this figure, an example is described where triaxial acceleration of the user's finger is acquired in a time series manner from a finger ring type measuring device (wearable terminal) attached to the finger. The measuring device is not limited to the finger ring type. For example, it may be of a glove type or a bracelet type, and the position of attachment may be an arm, a wrist, the flat of a hand, the back of a hand, or any other portions of a body.

Also, in addition to the acceleration, the angular velocity and the geomagnetism may be included. Further, even where the terms "wearable terminal" or "finger" appear in the following explanations as well as this figure, the present invention is not limited to these examples.

In addition, it is contemplated in FIG. 3 that the operation is performed by the finger of the user, but the operation may be performed by any other part of the body, and in addition, a tool such as a cable may be used.

The wearable terminal is configured to define coordinate axes in an absolute space with reference to an inclination of the finger in a standard state. The "standard state" as used herein refers to a state of the finger at a predetermined timing. The "predetermined timing" may, for example, be a timing at which the program of the wearable terminal starts the processing. It may also be a timing at which a predetermined signal has been input in the wearable terminal by external inputs such as a sound, pressing of a button, etc. It may further be a timing at which the wearable terminal has detected a particular movement. For example, as illustrated in FIG. 3, when the user maintains a predetermined shape, posture, and angle of a finger for a predetermined period of time, the wearable terminal may determine that a particular movement causing definition of the standard state has been made, regard this state as the standard state, and define the coordinate axes.

Any method may be used for defining the coordinate axes in the absolute space. For example, a sensor may include predefined xyz coordinate axes and the xyz coordinate axes of the sensor in the standard state may be defined as the xyz coordinate axes in the absolute space. In FIG. 3, the orientation of the fingertip in the standard state is defined as the z-axis, the direction extending from the flat to the back of the finger as the y-axis, and the direction vertical to the y-axis and the z-axis as the x-axis. In addition, for example, the gravitational acceleration direction may be calculated from the triaxial acceleration and thus the gravitational acceleration direction may be defined as the y-axis, relying on the fact that a resultant vector of the triaxial acceleration in the stationary state is oriented in the gravitational acceleration and assuming that the movement of the wearable terminal is small relative to the gravitational acceleration.

The wearable terminal acquires the triaxial direction acceleration after having defined the coordinate axes. In addition, the three dimensional inclination of the finger on the coordinate axes can be expressed, for example, by pitch, yaw, and roll with reference to the inclination of the finger in the standard state.

Figure 4:
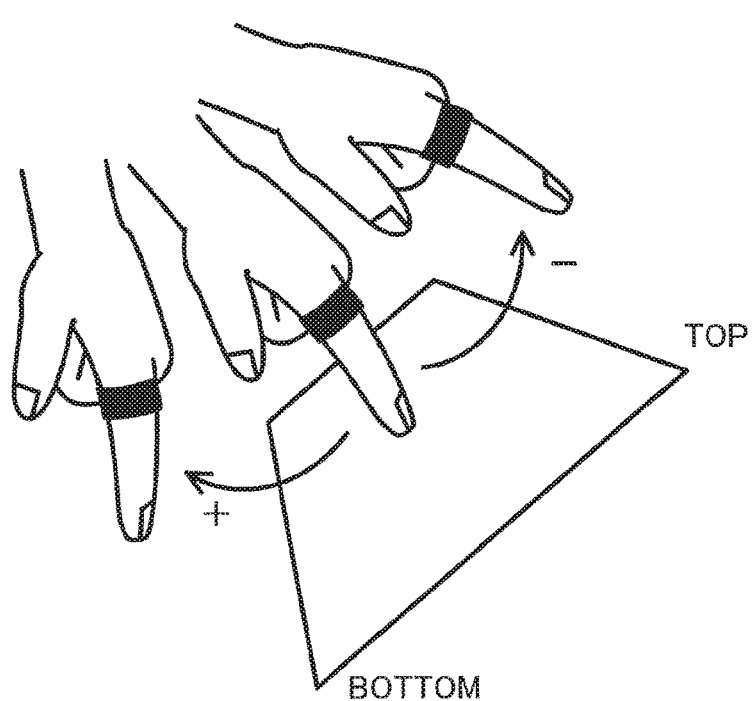
FIG. 4 is a diagram illustrating "pitch"
Figure 5:
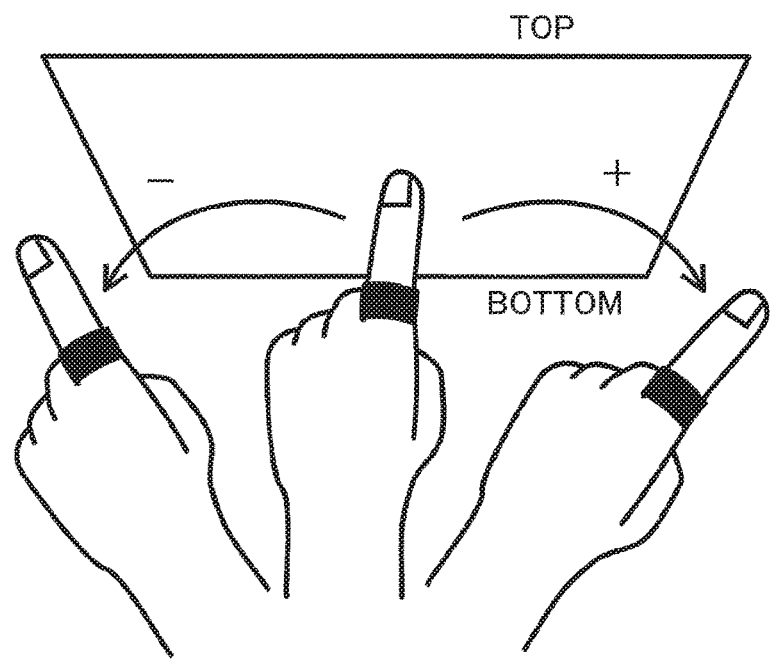
FIG. 5 is a diagram illustrating "yaw"
Figure 6:
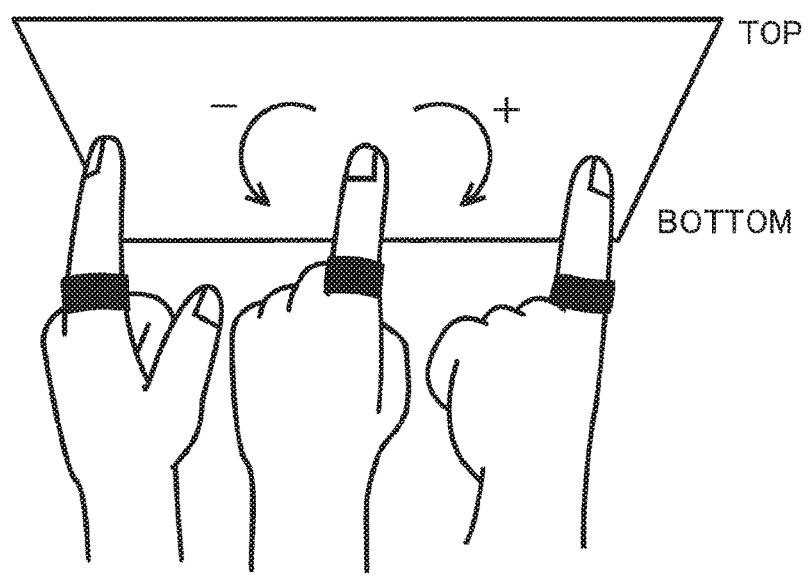
FIG. 6 is a diagram illustrating "roll"

FIGS. 4 to 6 are diagrams illustrating the pitch, yaw, and roll, respectively. The "pitch" as used herein refers to, as illustrated in FIG. 4, the angle of rotation of the finger in the vertical direction about an axis extending in the horizontal direction (the x-axis in FIG. 3) in the standard state. The "yaw" as used herein refers to, as illustrated in FIG. 5, the angle of rotation of the finger in the horizontal direction about an axis extending in the vertical direction (the y-axis in FIG. 3) in the standard state. The "roll" as used herein refers to, as illustrated in FIG. 6, the angle of rotation of the finger about an axis extending in in the forward-backward direction (the z-axis in FIG. 3) in the standard state.

In the context of the pitch, yaw, and roll illustrated in FIGS. 4 to 6, respectively, the downward direction, the rightward direction, and the clockwise rotation are each defined as their forward directions, respectively. Meanwhile, reverse directions that are reverse with respect to the downward, rightward, and clockwise directions may be defined as the forward directions, respectively. The pitch, yaw, and roll can be calculated on the basis of the movement information such as acceleration, angular velocity, and geomagnetism.

It is contemplated that the communications between the wearable terminal and the estimation device 100 are effectuated by various means of communications such as wireless LAN and Bluetooth (Registered Trademark). In addition, the estimation device 100 may be included in the wearable terminal.

It is also contemplated here that, as the acquirer 101 acquires two pieces of information, i.e., the area information and the movement information, the acquirer 101 may be divided into two acquirers each configured to acquire corresponding each of the above two pieces of information.

The operation recognizer 102 is configured to determine whether the movement of the user is an operation for the operation section of the correct-answer area. The calculator 102A is configured to estimate the position to which a subsequent operation by the user is corresponding (i.e., the position which the user focuses his/her attention) on the basis of the movement information and the area information of the correct-answer area. The determiner 102B determines, based on the estimated position corresponding to the operation section of the correct-answer area, whether the subsequent operation (or movement) by the user is directed to the operation section of the correct-answer, i.e., whether the user attempts to operate the operation section of the correct-answer area. More specifically, the calculator 102A calculates a likelihood of the user operating the operation section of the correct-answer area on the basis of the positional relationship between the estimated position and the correct-answer area. The determiner 102B determines, when the likelihood is equal to or larger than a predetermined threshold, that the subsequent operation (or movement) by the user is directed to the operation section of the correct-answer (the user attempts to operate the operation section of the correct-answer area), in other words, that the movement information is the operation by the user for the operation section of the correct-answer area. Meanwhile, the determiner 102B determines, when the likelihood is less than that threshold, that the subsequent operation (or movement) by the user is directed to the operation section of the correct-answer (i.e., the user does not attempt to operate the operation section of the correct-answer area), in other words, the movement information is not the operation by the user for the operation section of the correct-answer area. The operation recognizer 102 is described further in detail below.

The operation recognizer 102 is configured to estimate the position to which the subsequent operation by the user corresponds using the calculator 102A on the basis of the movement information, as stated above. In the following discussion, a situation where the user intends to perform an operation of a certain portion in the operation area of the target device to be operated (which may be the operation section of the correct-answer area or any other operation sections) is assumed. Also, estimation of this position is referred to as the "operation position estimation." Here, the operation position estimation may include estimating the area that includes this position therein. In this case, the estimated area is referred to as an "area of estimation." The calculator 102A calculates the likelihood of the user operating the operation section of the correct-answer area in accordance with the positional relationship between the estimated position (or area) and the correct-answer area. This likelihood denotes the probability of the user contacting the correct-answer area, which may also be referred to as "contact likelihood." As one example, the first value is calculated as the likelihood if the estimated position is included in the correct-answer area, and, if not, calculates the second value as the likelihood. Alternatively, the likelihood may be calculated in accordance with the degree of overlapping between the estimated area and the correct-answer area. For example, when the area size of overlapping between the estimated area and the correct-answer area is large, then the likelihood may be calculated as a large value in proportion to that area size. Alternatively, the likelihood may be calculated using other methods, for example, a value obtained by integration of the probability density distribution portion within the overlapping or the maximum value within the probability density distribution portion may be used when an area which is estimated as described below is represented by the probability density distribution. The determiner 102B determines whether the user attempts to operate the operation section of the correct-answer area (which is referred to as the "correct-answer area determination") in accordance with the likelihood. For example, when the likelihood is equal to or larger than a threshold, then it is determined that the user attempts to operate the operation section of the correct-answer area, and when it is less than the threshold, it is determined that the user attempts to operate an operation section other than the correct-answer area. When it has been determined that the user attempts to operate the operation section of the correct-answer area, it is determined that the operation of the user is correct, and in cases other than that, it is determined that the user's operation is erroneous (the determination of this correctness is referred to as the "correctness determination").

Figure 7:
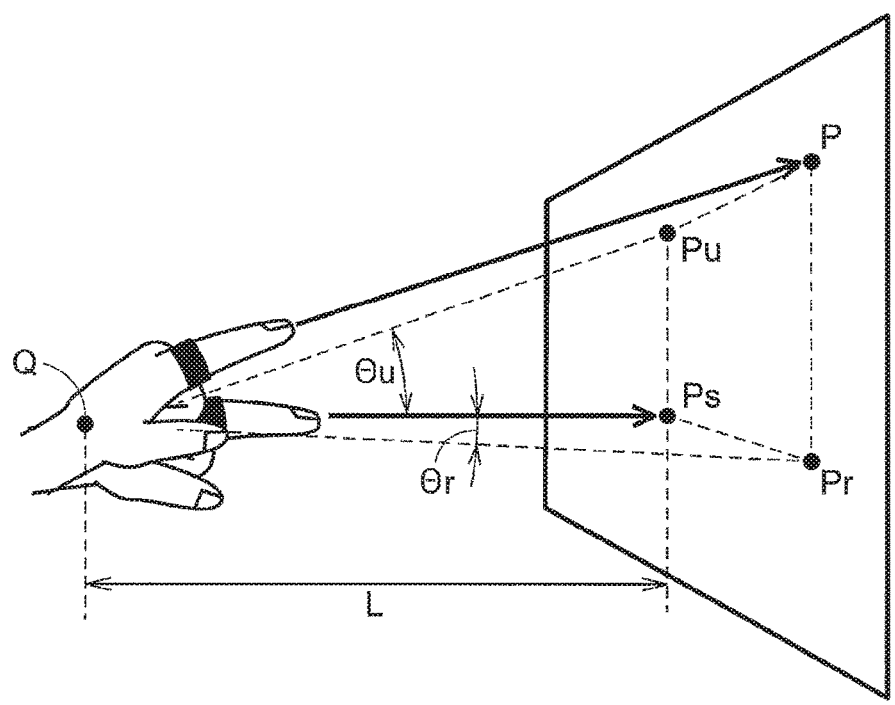
FIG. 7 is a diagram illustrating an example of operation position estimation.

FIG. 7 is a diagram illustrating an example of operation position estimation. A state where the finger is vertically oriented with respect to the operation surface of the operation target device indicated by the rectangle on the left side is referred to as the "standard state." In the standard state, the position of intersection of the direction pointed to by the finger with the operation surface is represented by "Ps." When the angle of the finger has changed departing from the standard state, the position of intersection of the direction in which the user is pointing by his/her finger with the operation surface is represented by "P." When it is assumed that the user orients his/her finger to the portion to be operated and extends his/her arm in that direction and thus make an access to the operation surface, then the position "P" can be estimated as the position at which the user attempts to perform the operation.

When the finger is inclined, departing from the standard state, rightward by the angle "θr" and upward by the angle "θu" with respect to the wrist as the fulcrum, the position of "P" is to be obtained, regarding that the position that is pointed to on the operation surface is shifted from "Ps" to "P". If the position of the wrist of the user in the standard state is represented by "Q" and the distance between the position "Q" and the operation target device is represented by "L," then the distance "L" represents the distance "QPs." When the intersection point of a horizontal line passing "Ps" with a vertical line passing "P" is represented by "Pr," then the angle "PsQPr" will be "θr." When the intersection point of the vertical line passing "Ps" with the horizontal line passing "P" is expressed by "Pu," then the angle "PsQPu" will be "θu." Accordingly, the position "P" can be indicated by a position that is shifted from "Ps" rightward by "L tan θr" and upward by "L tan θu."

The finger's inclinations "θr" and "θu" can be obtained from the xyz coordinate axes in the defined absolute space.

However, the finger's inclination is susceptible to subtle vibration of the body, noise at the time of measurement, etc. In order to be robust to the noise, an average value may be used that is calculated using a low-pass filter or the like.

In addition, the position "P" may be indicated as a range of an average value increased or decreased by the standard deviation. When the standard deviation is used, it is possible to increase the amount of information that can be handled compared with a case where only the average value is used. For example, when only the average value is used, the same value results both in a case where most of the values are distributed in the neighborhood of the average value and in a case where values are distributed at two regions that are away to the same extent from the average value. However, by using the variance, they are allowed to be handled as distinct data different from each other.

Figure 8:
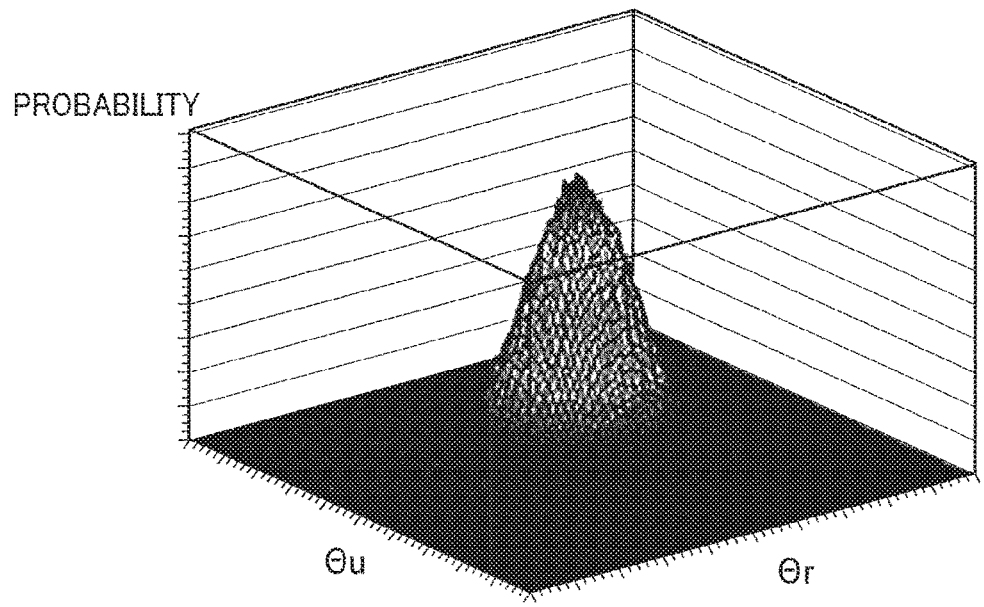
FIG. 8 is a diagram illustrating an example of probability density distribution.

In addition, the position "P" may be represented using a probability density distribution. FIG. 8 is a diagram illustrating an example of probability density distribution. The center point in the xy plane represents the position "P" illustrated in FIG. 7. The x axis indicates the difference of "θr" with respect to the position "P", the y axis indicates the difference of "θu" with respect to the position "P", and the z axis indicates the value obtained by dividing the number of samples at each position by the total number of samples. By using such a probability density distribution, the position "P" may be expressed as an area (range) instead of a point.

Figure 9:
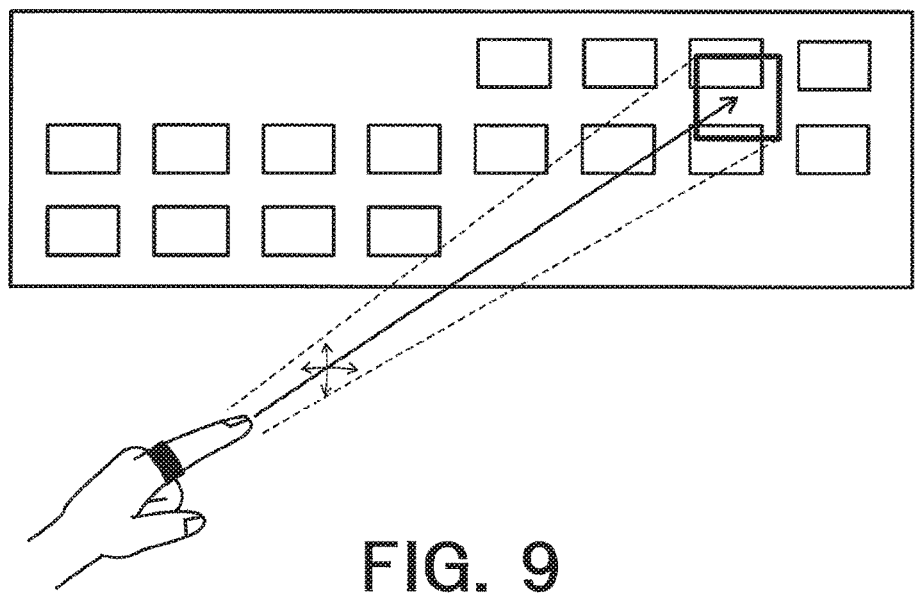
FIG. 9 is a diagram illustrating an example of calculation of contact likelihood.

The operation recognizer 102 obtains contact likelihoods at each operation area. The "contact likelihood" as used herein refers to the probability of the user contacting the operation area. FIG. 9 is a diagram illustrating an example of calculation of the contact likelihood. The arrow shown by the solid line represents the locus of the finger and the contact position in a case where it is assumed that the finger moves at a constant angle. The rectangle indicated by a thick frame represents the area of the probability density distribution illustrated in FIG. 8. Here, the rectangle indicated by the thick frame is referred to as a "trial area." The trial area corresponds to the area that includes the position at which the user intends to perform the operation. Within this trial area, there exist two overlapping portions that overlap with the operation area (the white portions within the thick-frame rectangle of FIG. 9). Accordingly, the contact likelihoods should be obtained with respect to these two overlapping portions. Also, the operation section associated with the operation area whose contact likelihood is the largest is estimated to be the operation section for which the user intends to perform the operation. It is also contemplated that, without obtaining the contact likelihood, it may be regarded that there is a possibility of the user contacting multiple operation areas having these overlapping portions.

As the methodology of obtaining the contact likelihood, for example, a method may be contemplated according to which the contact likelihood is represented by a value obtained by integration of the probability density distribution of the overlapping portion. Alternatively, another method may be contemplated according to which the contact likelihood is represented by the maximum value of the probability density distribution included in the overlapping portion. For example, in FIG. 9, an operation section is contemplated whose two operation areas may have the same size, but it is also possible that one operation section having a small operation area and the other operation section having a large operation area may be included in the trial area. In this case, if the contact likelihood is given as a value obtained by integration of the probability density distribution of the overlapping portion, the contact likelihood may become the smaller for the operation area having the small operation area despite the fact that this operation section resides at the center of the trial area. Accordingly, the contact likelihood may be defined to be the maximum value of the probability density distribution, the proportion of the overlapping portion in the operation may be taken into account, or weighting may be provided in accordance with the size of the operation area or in accordance with whether it is an operation area in a task, etc.

The operation recognizer 102, as described above, performs determination of whether the user's operation position is the correct-answer area using the contact likelihood, and determines the correctness of the user's operation. Here, although the correctness of the user's operation is determined, the determination may be made to the effect that the user does not have an intention to operate the operation section of the correct-answer area when it has been determined that the user does not attempt to operate the operation section of the correct-answer area, in place of determining that the user's operation is erroneous. In addition, when it has been determined that there is not the possibility of the user contacting the task area of each component of the operation target device, it may be determined that the user has no intention of performing the operation.

The distance "L" and the position at which the finger starts its movement may be defined to the predetermined position by setting the finger or wrist of the user at the predetermined position at the time when the user starts the operation. Alternatively, they may be obtained via the acquirer 101 from a system that is capable of identifying the position of the finger such as the distance "L" on the basis of the image of a capturing device such as a camera disposed near the operation target. An average value calculated from the task history of the user may be used. Also, the distance "L" may, in the same or similar manner as in the case of the angles θr and "θu," be represented by the probability density distribution.

It is also contemplated here that the operation is performed by a finger contacting a button and the like, but any operation that is performed without contact of a finger may be treated as the operation. For example, when a non-contact type IC card is held over a card reader, it is not brought into contact with the card reader, but the act of holding it over the reader may be treated as the operation for the operation section (i.e., the card reader).

The output controller 103 determines the form and content of output on the basis of the determination result of the operation recognizer 102. In addition, it may also be possible that nothing is output in such a case where the operation recognizer 102 determined that the user has no intention to perform the operation.

The form and content of output may be defined as appropriate. As the form of output, for example, audio information such as a warning sound or guidance voice, visual information including colors and images such as "OK" and "NG," or somatic sensation information such as causing a wearable terminal or the like attached to the user to vibrate may be contemplated.

The content of output may also be defined as appropriate. The determination result such as "OK," "NG," and the like may be simply output. The distance with respect to the correct-answer area may be made to be recognized in a relative manner by the strength of sound, the degree of blinking of light, or change of color including red for being erroneous, and blue for being correct, or orange if any error may occur in the operation and taking into account the usability for the user. Alternatively, display or audio output may be specifically provided such as "please operate the button on the right side." As has been discussed above, when guidance about the correct-answer area is to be provided, the operation recognizer 102 or the calculator 102A may calculate the distance between the correct-answer area and the trial area on the basis of the area information.

It is contemplated that the output destination may include, for example, an output device installed near the operation target device such as a monitor, a speaker, and the like; a mobile terminal carried by the user; and a wearable terminal attached to the body of the user such as eye glasses, a headset, etc. In addition, a target device of output may provide an output at a different location, as an example of which the wearable terminal may project the output on a screen. The output controller 103 may select one output method from a plurality of these predetermined output methods on the basis of the determination result.

Next, the flow of the processing by the operation recognition device 100 in accordance with the first embodiment is described.

Figure 10:
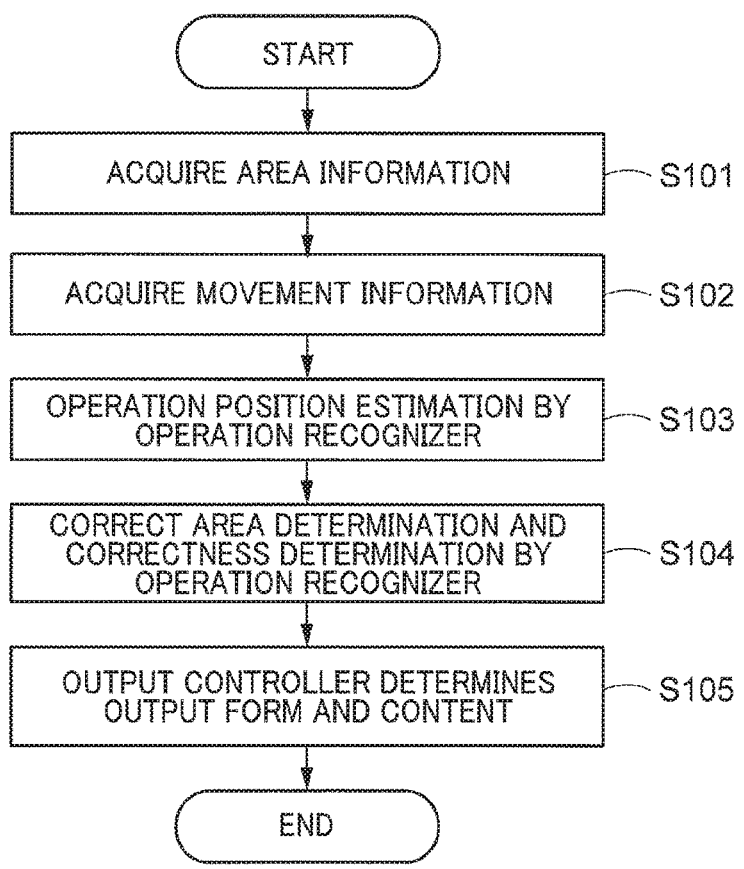
FIG. 10 is a schematic flow chart of the entire processing of the operation recognition device in accordance with the first embodiment.

FIG. 10 is a schematic flow chart of the entire processing of the operation recognition device 100 in accordance with the first embodiment. This flow is started at the timing at which power supply to the operation recognition device 100 is started or at the timing at which information on the operation target is input from the user or the administrator or the like.

The acquirer 101 acquires the area information (S101). The counterpart device, from which the area information is to be acquired, the area information to be acquired, and the like may be specified in advance in the acquirer 101, or may be notified by the user, the administrator, or the like. The acquired area information is sent to the operation recognizer.

The acquirer 101 acquires the movement information of the user from the wearable terminal or the like (S102). The movement information is sent to the operation recognizer 102 as needed.

The calculator 102A of the operation recognizer 102 calculates the operation position (area) for which the user attempts to perform the operation on the basis of the movement information (S103). Also, calculator 102A calculates the likelihood of the user operating the operation section of the correct-answer area on the basis of the positional relationship between the calculated operation position and the correct-answer area.

The determiner 102B of the operation recognizer 102 determines whether the user is attempting to perform the operation section of the correct-answer area in accordance with the likelihood that has been calculated by the calculator 102A (correct-answer area determination), and determines the correctness of the operation on the basis of the determination result (S104).

The output controller 103 obtains the determination result from the operation recognizer 102 and determines the output method (S105). The foregoing constitutes the flow of the entire processing of the first embodiment.

As has been discussed in the foregoing, it is made possible in accordance with the first embodiment to detect in advance that the user will erroneously perform the operation. Accordingly, it is made possible to prevent an error in the operation by providing a warning or the like before the user actually performs the erroneous operation.

(Second Embodiment)

Next, a second embodiment is described. In the following explanations, explanations overlapping with those describing the preceding embodiment are omitted.

In the first embodiment, the operation recognizer 102 estimates, as illustrated in FIG. 8, the position at which the user attempts to perform the operation (the position to which the subsequent operation by the user corresponds or the position on which the user focuses his/her attention) from the movement of the finger or the like while it is spaced away from the operation target. Since this estimation is susceptible to the movement of the body, noise, etc., it is ensured that the accuracy of the estimation is increased by using the probability density distribution and the like. In contrast, the operation recognizer 102 in accordance with the second embodiment is configured to estimate the contact position when the user contacts the operation target and thus determines whether it is the correct-answer area. Whether the user has contacted the operation target device can be determined by the movement information.

The operation position estimation at the time of actual contact performed in the second embodiment is referred to as the "contact position estimation." The contact position estimation is obtained, in the same manner as in the operation position estimation in accordance with the first embodiment, from the amount of change of the angle of the finger with reference to the standard state. Meanwhile, the contact position estimation allows for estimation with higher accuracy than the operation position estimation. In the first embodiment, since the estimation is performed at the point when the finger is in the air (before the finger contacts the operation target), the estimation may contain not a few errors due to vibration of the finger, deviation of the finger from the actual orientation, etc. In contrast, in accordance with the second embodiment, the estimation is performed based on the information at the point when the finger is brought into contact (with the operation target), so that the contact position can be more correctly estimated in a state where the vibration of the finger disappears and there is no deviation of the orientation.

Even when the user has contacted the operation target device, it is still possible to prevent erroneous operation by the user in advance as long as the operation is not started or completed upon mere contact with the operation area. For example, suppose cases where operations are performed such as turning of a dial and pulling of a lever. When the dial and the lever are not the operation section of the correct-answer area, the actions of "turning" and "pulling," which are necessary to complete the operation, will not take place as long as a warning can be provided at the very moment when the dial and the lever are contacted. By virtue of this, occurrence of actual erroneous operations is prevented in advance.

Figure 11:
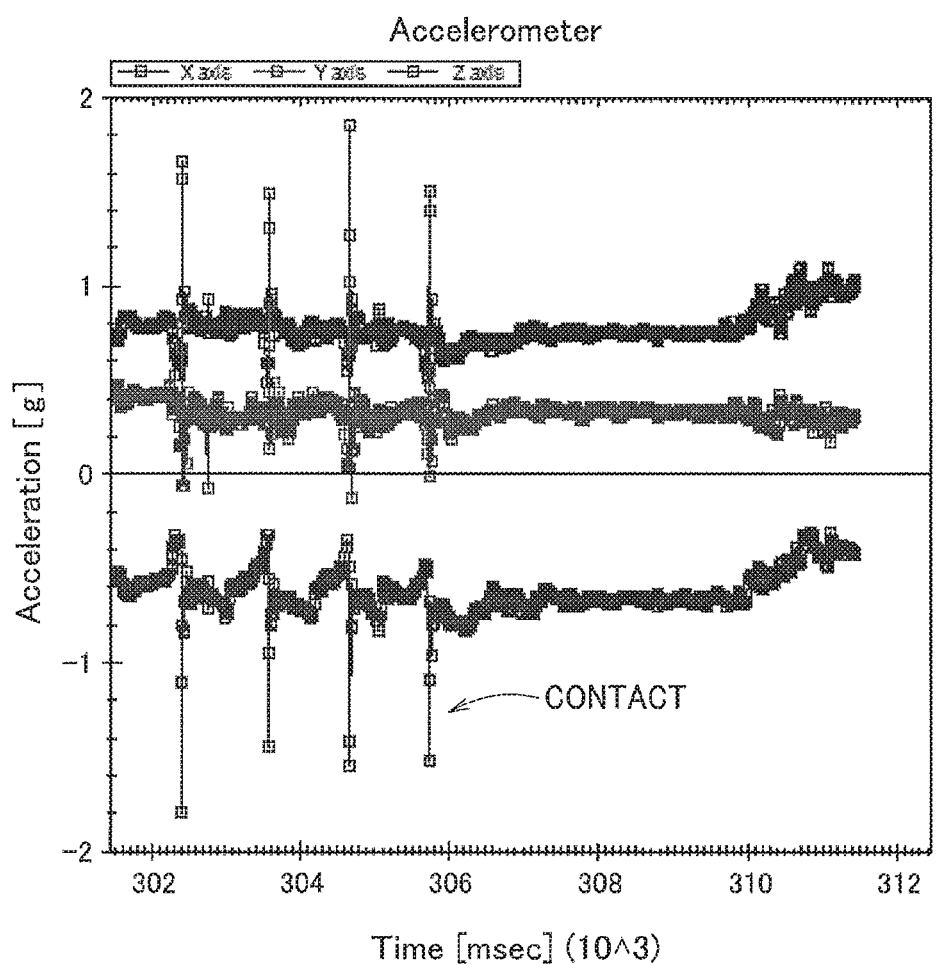
FIG. 11 is a diagram illustrating an example of sensor data measured by an acceleration sensor.

FIG. 11 is a diagram illustrating an example of sensor data measured by an acceleration sensor. When a finger contacts the operation section, etc., a rapid change occurs in the waveform of the acceleration and the pulse waveform is formed. As a result, by detecting and using the pulse waveform of the acceleration, it is made possible for the operation recognizer 102 to detect the contact.

It is also contemplated that the operation recognizer 102 is capable of detecting the contact with high accuracy on the basis of a first condition and a second condition which will be described later.

The "first condition" as used herein refers to a condition that the amount of change in the acceleration is equal to or larger than a predetermined "A1," where an average value of acceleration in a predetermined period of time in the past is used as a reference value.

The "second condition" as used herein refers to a condition that the amount of change in acceleration in the periods of time between the time "Tmax−T2" and the time "Tmax−T1" and between the time "Tmax+T1" and the time "Tmax+T2" is less than a predetermined threshold "A2," where "Tmax" refers to the time at which the amount of change in acceleration with reference to the reference value is the largest, "T1" refers to a predetermined time interval, and "T2" refers to another predetermined time interval.

It is also contemplated that the time intervals "T1" and "T2" follows the relationship of "T2>T1." In addition, the predetermined thresholds "A1" and "A2" follows the relationship of "A1>A2." For example, the predetermined threshold "A2" may take a value that is about a half of the "A1" or less, and should take a value that is larger than the reference value. The time interval in the past is, for example, the time in the order of about 100 to 300 msec (millisecond). When an average value of the acceleration during too long a time is defined to be the reference value, then it may become difficult to perform detection in a case where contacts of the finger upon the operation area are repeatedly performed, so that the time interval may be modified as appropriate.

In addition, "A1" may be defined as "0.5×gravitational acceleration" or may be defined with reference to a peak value of the measured data by making contact with the operation area at the time of the initial setting.

In addition, the time periods from the time "Tmax−T2" to the time "Tmax−T1" and from the time "Tmax+T1" to the time "Tmax+T2" refers to time intervals extending prior to and after the time "Tmax," respectively, where the amount of change in the acceleration is the largest at the time "Tmax".

As described above, the waveform of acceleration at the time of contact takes a steep shape as the time during which the waveform of acceleration is detected is short. As a result, when the waveform before and after the time at which the amount of change in the acceleration becomes the largest takes the same value as the reference value, then the operation recognizer 102 may determine that the finger has contacted the operation area. By using the first condition and the second condition, it is made possible to avoid detection of contact due to an action which should not actually involve contact of the finger with the operation area.

In addition, a third condition may be further included along with the first and second conditions. The "third condition" as used herein refers to a condition that the position of the wrist is placed in a stationary state where the position of the wrist falls within a predetermined range during the time interval extending on both side of the time "Tmax." When the position of the wrist can be calculated in a time series manner, the operation recognizer 102 is allowed to detect with higher accuracy the contact by determining the contact with the third condition taken into account.

Figure 12:
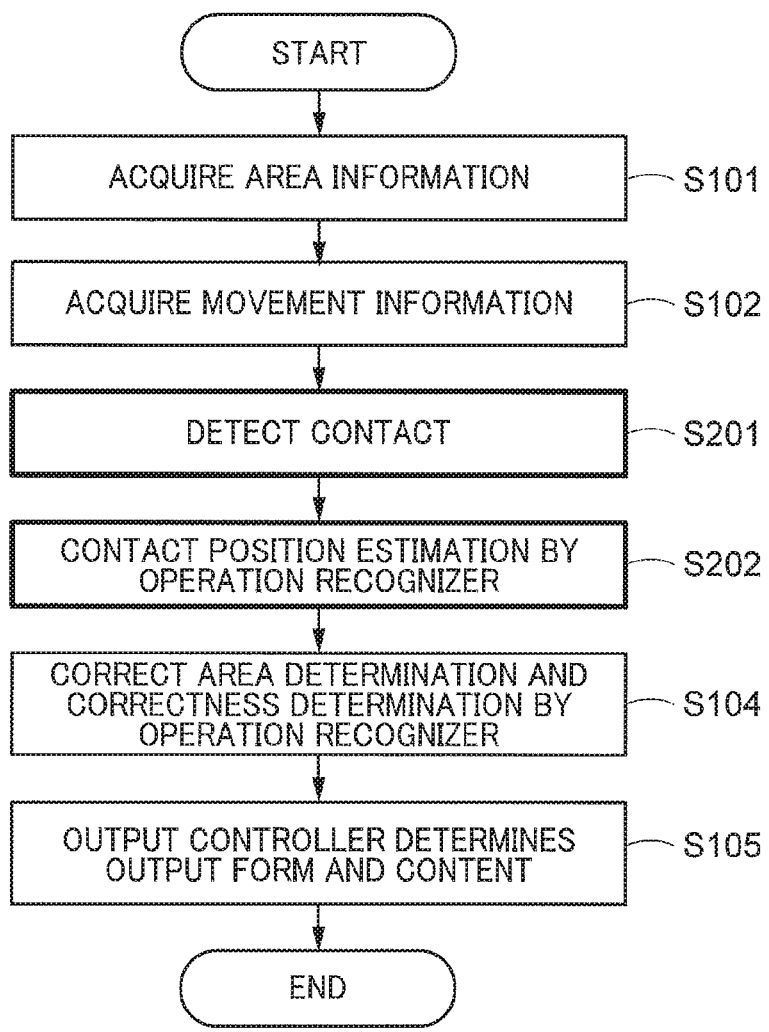
FIG. 12 is a schematic flow chart of the entire processing of the operation recognition device in accordance with the second embodiment.

The configuration and the function of the second embodiment are the same as those in the first embodiment, description of which is therefore omitted. FIG. 12 is a schematic flow chart of the entire processing of the operation recognition device 100 in accordance with the second embodiment. In the second embodiment, in the same manner as in the flow of the first embodiment, the acquisition of the area information (S101) and the acquisition of the movement information (S102) proceed in the same manner, but the other procedures are not performed until the contact is detected (S201). When the operation recognizer 102 has detected the contact (S201), the contact position estimation (S202) is performed by the operation recognizer 102. The method of the contact position estimation and the subsequent flow are the same as in the first embodiment.

As has been discussed in the foregoing, it is made possible in accordance with the second embodiment to prevent in advance the user form making an error in the operation with regard to the operation that is not completed upon mere contact with the operation section alone, and it is made possible to urge the user to perform the operation for the correct operation section.

(Third Embodiment)

The operation recognizer 102 in accordance with a third embodiment performs not only the operation position estimation performed in the first embodiment but also the contact position estimation presented in the second embodiment. Specifically, the operation recognizer 102 is configured to determine the correctness of the operation prior to the user contacting the operation section and further determines the correctness of the operation at the time when the user contacts the operation target device. By virtue of this, in the context of a task having multiple operations, even when the operations are performed one after another, the operation recognizer 102 is allowed to determine the correctness of each operation and, if it is the correct operation, identify the correct-answer area of the subsequent operation, making it possible to determine whether the subsequent operation is correct.

The block diagram of the third embodiment is identical with those of the first and second embodiments. In addition, the processing of the operation position estimation and the contact position estimation performed in accordance with this embodiment proceeds in the same or similar manner as the operation position estimation performed in the first embodiment and the contact position estimation performed in the second embodiment, the description of which is therefore omitted.

It is also contemplated that the distance "L" and the position at which the finger begins to move cannot be fully recognized by the movement information alone, so that the user has to perform an action such as re-setting the finger at a predetermined position prior to performing the subsequent operation or a position recognition system such as a camera has to perform processing such as grasping a new position of the finger following completion of one operation.

Figure 13:
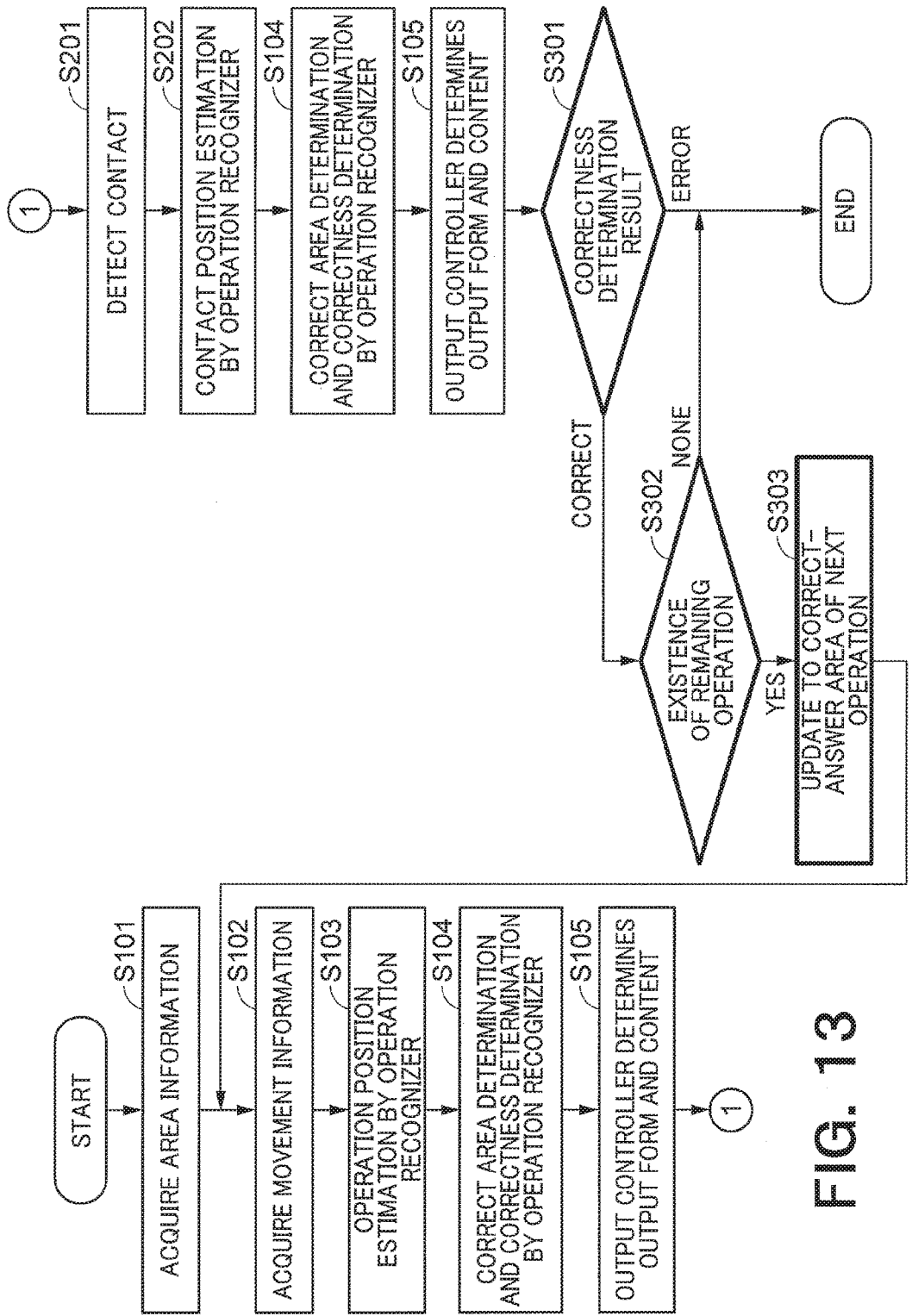
FIG. 13 is a schematic flow chart of the entire processing of the operation recognition device in accordance with the third embodiment.

FIG. 13 is a schematic flow chart of the entire processing of the operation recognition device 100 in accordance with the third embodiment. In this flow, detection of the contact (S201) and the subsequent flow (S202, S104, and S105) in accordance with the second embodiment are executed following the flow (S101 to S105) in accordance with the first embodiment. Also, a procedure on the basis of the result of the correctness determination is newly added thereto. Here, the new processing flow is described.

When it has been determined by the correctness determination of the contact position that the contact position is not the correct-answer area ("error" in S301), then the processing is terminated. When it has been determined that the contact position is the correct-answer area ("correct" in S301), then the operation recognizer 102 confirms the presence of remaining operation(s) of the task, and, if there is no operation remaining ("none" in S302), terminates the processing. When there is any operation remaining ("yes" in S302), the operation recognizer 102 updates the correct-answer area so that it now corresponds to another correct-answer area corresponding to the subsequent operation (S303). By virtue of this, the operation recognizer 102 is capable of identifying the correct-answer area even in the operation position estimation in the subsequent operation. After the update, the movement information is again acquired (S102) and the operation position estimation is performed (S103). The above procedures constitute the entire processing flow in accordance with the third embodiment.

It is also contemplated that in FIG. 13, the flow based on the result of the correctness determination is to be executed after the output controller 103 performed the output control in accordance with the determination result on the basis of the contact position estimation, but the execution of the flow may be performed simultaneously with the output control and the sequence may be modified.

The operation recognizer 102 may determine that the determination result that is to be sent to the output controller 103 is either the determination result of the operation position estimation or the determination result of the contact position estimation, and the output controller 103 may modify the form or content of the output between the determination result of the operation position estimation and the determination result of the contact position estimation. For example, control may be carried out such that the warning based on the result of the operation position estimation may be output as a small indication or sound while the warning based on the result of the contact position estimation may be output as a large indication or sound so that the user notices it. By virtue of this, it is made possible to improve usability for the user by allowing for the discrimination between the preliminary warning prior to the contact and the warning after the contact.

In addition, histories of the operation position estimation and the contact position estimation may be recorded and a learning function may be provided for increasing the accuracy in the operation position estimation. These histories can be used for calculating or updating the probability density distribution. For example, it may be contemplated that the shape of the probability density distribution is to be updated such that the result of the operation position estimation corresponds to the result of the contact position estimation. In addition, when the operation section that has been estimated by the operation position estimation corresponds to the operation section that has been estimated by the contact position estimation, then the operation position estimation is regarded as the correct position, and the history of the contact position estimation at this point may be used as the right-answer data, and, if they do not correspond to each other, then the operation position estimation is regarded as being erroneous, and the history of the contact position estimation at this point may be used as the error data. On the basis of the right-answer data and the error data, it is made possible to modify the method of the operation position estimation.

For example, it may be contemplated that, when the proportion of the error data is high, then inclination may be given to the weighting at the time of calculation of the contact likelihood. By virtue of this learning function, it is made possible to perform with higher accuracy the operation position estimation.

In addition, the accuracy of the contact position estimation may also be increased by obtaining data of the operation section from another system that determines the operation section using a camera and the like and comparing the data of the operation section with the result of the contact position estimation.

As has been discussed in the foregoing, in accordance with the third embodiment, since not only the correctness determination prior to the contact but also the correctness determination at the time of the contact are performed, it is made possible to increase the possibility of preventing the errors in the user's operation. It is also made possible to determine the correctness of each operation of each task even in the case involving tasks whose multiple operations are to be sequentially performed.

(Fourth Embodiment)

In a fourth embodiment, the operation content after the user contacting the operation section is also estimated and determination of whether the operation content after the contact is correct is performed.

Even when the operation section is correct, an error may occur in the operation content, for example, when a switch that should be flipped up is flipped down. In this embodiment, the action pattern that is the operation content performed by the user is recognized from the movement information. Here, this recognition is referred to as the "action pattern recognition." Also, the correctness of the operation content is determined on the basis of the action pattern and the correct action pattern that should be performed. This determination is referred to as the "correct operation determination." By virtue of this, it is made possible to detect an error in the operation with regard to the operation content.

Figure 14:
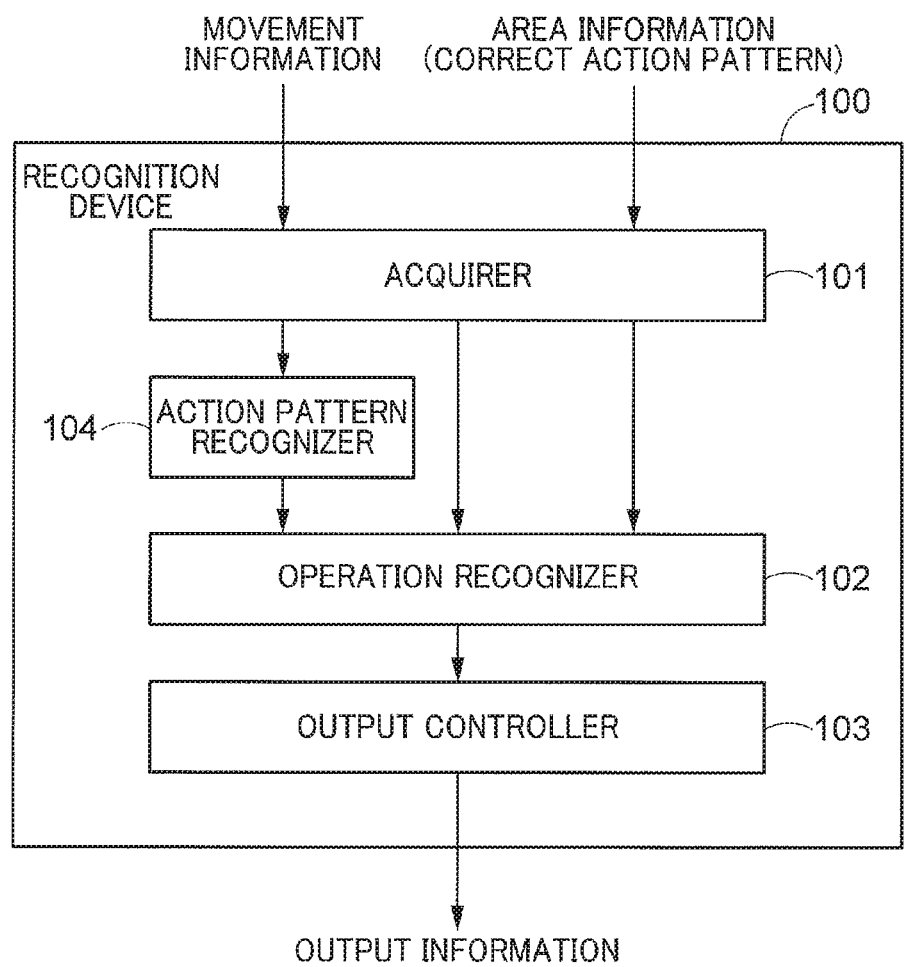
FIG. 14 is a block diagram illustrating an example of the schematic configuration of the operation recognition device in accordance with the fourth embodiment.

FIG. 14 is a block diagram illustrating an example of the schematic configuration of the operation recognition device 100 in accordance with the fourth embodiment. The fourth embodiment, when compared with the first embodiment, further includes an action pattern recognizer 104.

The acquirer 101 acquires, as the correct action pattern, the action to be recognized by the action pattern recognizer 104.

The correct action pattern may be included in the area information. It may be registered in advance, as the content of the procedure manual, in a database that is internal or external to the operation recognition device 100, a system, a wearable terminal, and the like and the acquirer 101 may be configured to acquire the correct action pattern when it acquires the area information.

In addition, the acquirer 101 may actively acquire the correct action pattern by receiving an instruction from the user or the wearable terminal, etc. and recognizing the operation target device or the operation content.

It is contemplated here that the acquirer 101 acquires the correct action pattern, but a unit that is separate from the acquirer 101 and configured to acquire the correct action pattern may be provided in such a case where the area information and the correct action pattern are stored in different devices, systems, and the like.

The action pattern recognizer 104 is configured to acquire the movement information from the acquirer 101 and recognize the action pattern of the user from the movement information. The action pattern may be determined on the basis of the acceleration acquired in a time series manner, the inclination of the finger, or their feature quantities. As the feature quantities, frequency distribution acquired by frequency analysis, a histogram of acceleration calculated at a predetermined time interval, and a histogram of the direction of change of the inclination may be mentioned. In addition, discriminators that each correspond to corresponding each of the multiple operations may perform discrimination of the operations and the feature quantity may be defined on the basis of the distribution of the likelihoods of the corresponding operations calculated by each of the discriminator. The action pattern recognizer 104 may calculate the similarity of the feature quantity and the feature quantity of the correct action pattern. The similarity may be, for example, a value corresponding to the difference between them. For example, it may be the absolute value of the difference between them or a square value thereof, or any other values. The correct action pattern may be described by the feature quantity or may be described by an identifier indicative of the pattern.

The action pattern may be determined by comparing the calculated feature quantity with a reference feature quantity serving as predetermined criteria, obtaining the similarity of these feature quantities, and determining whether the similarity exceeds a predetermined threshold, and the like. A criterion for determining the action pattern may be given in advance to the action pattern recognizer 104 or may be acquired by the acquirer 101 along with the correct action pattern.

Figure 15:
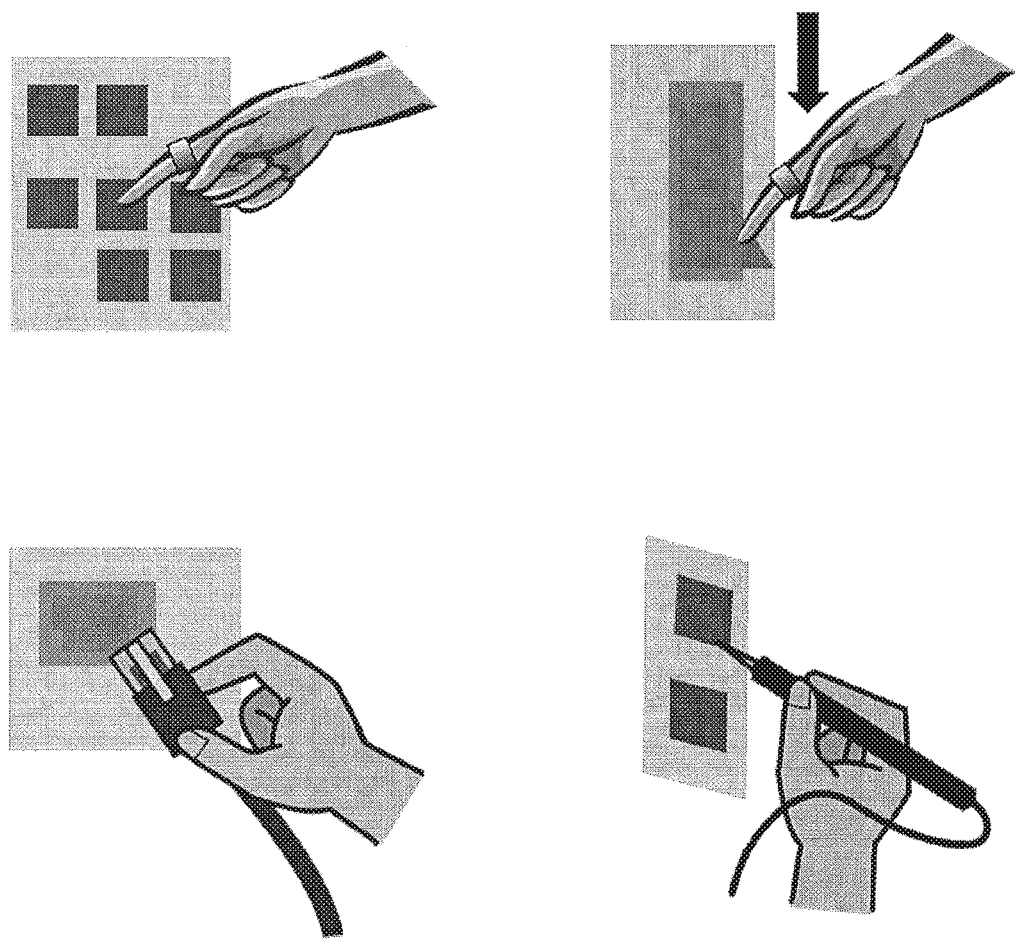
FIG. 15 is a diagram illustrating an example of an action pattern in a basic operation.

FIG. 15 is a diagram illustrating an example of an action pattern in a basic operation. FIG. 15(A) depicts the action associated with pressing of a button, FIG. 15(B) depicts the action associated with flipping of a switch, FIG. 15(C) depicts the action associated with connecting a cable, and FIG. 15(D) depicts the action associated with contacting by a tester. These basic action patterns have reference feature quantities distinct from each other.

For example, pressing of the button and the connecting of the cable are the same operation in that they are associated with the operation of pressing something so that it enters something, but they differ in their repulsive forces and impacts at the time of the pressing action, so that there will be a difference in the acceleration patterns occurring at that point. The action pattern recognizer 104 may, for example, perform discrimination of these four basic action patterns for the movement information and calculate the likelihood of the action corresponding to each basic action. In addition, the action pattern recognizer may calculate the feature quantity of that action on the basis of the distribution of each likelihood and determine one single action pattern. The action pattern that has thus been determined may be represented by that feature quantity or may be represented by an identifier that corresponds to that pattern.

Also, in addition to acceleration, when angular velocity, geomagnetism, atmospheric pressure, light, sound, biosignal, and the like may be acquired from an attached sensor and they may be used as the feature quantity.

As the discriminator, known pattern recognition methods such as neural networks and support vector machines may be used.

It is also contemplated here that the action pattern recognizer 104 determines one single action pattern and the action pattern that has thus been determined is subjected to the determination by the operation recognizer 102 of whether it is the correct operation, but the action pattern recognizer 104 may calculate the feature quantity or the likelihood of each basic action and the operation recognizer 102 may determine the action pattern on the basis of the feature quantity or the likelihood of each basic action, and further determine whether this action pattern is the correct operation.

The operation recognizer 102 obtains, in the same or similar manner as in the previous embodiments, the movement information and the area information from the acquirer 101. Information on the individual operations is included in the area information as in the same or similar manner as in the previous embodiments, and in accordance with this embodiment, the correct action pattern is further included therein. Accordingly, the operation recognizer 102 is allowed to identify the correct action pattern for the current operation and perform the correct operation determination.

When the similarity is sent from the action pattern recognizer 104 to the operation recognizer 102, the correct operation determination may confirm whether the action pattern is the correct action pattern on the basis of whether the similarity is equal to or larger than the threshold. When the similarity is less than the threshold, it is determined that it is not the correct action pattern, and it is thus determined that the operation is erroneous. Alternatively, the action pattern recognizer 104 may sent the feature quantity to the operation recognizer 102, and the operation recognizer 102 may compare this feature quantity with the feature quantity of the correct action pattern and thereby calculate the similarity, and make the determination in the same or similar manner on the basis of the similarity. Alternatively, it is also possible that the action pattern recognizer 104 may send an identifier of the action pattern to the operation recognizer 102, and the operation recognizer 102 may compare this identifier with the identifier of the correct action pattern and thereby make the determination.

Figure 16:
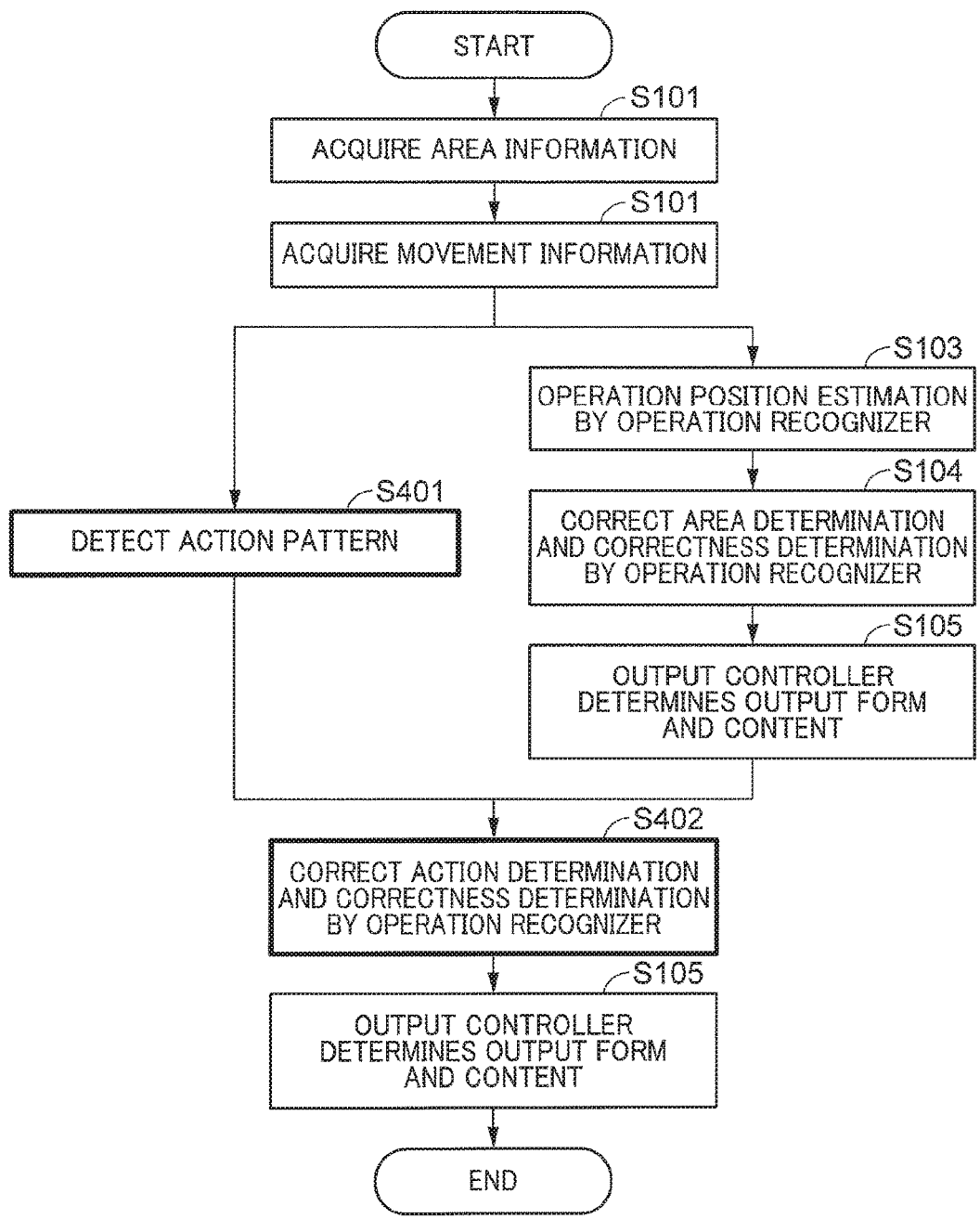
FIG. 16 is a schematic flow chart of the entire processing of the operation recognition device in accordance with the fourth embodiment.

FIG. 16 is a schematic flow chart of the entire processing of the operation recognition device 100 in accordance with the fourth embodiment. In this flow chart, it is contemplated that the action pattern recognizer 104 is independent from the operation recognizer 102 and configured to always obtain the movement information from the acquirer 101 and detect the action pattern. Control may be carried out such that the detection of the action pattern is started after the operation recognizer 102 has detected the contact by the user.

The action pattern recognizer 104 obtains the movement information and detects the action pattern (S401). The action pattern that has thus been detected is sent to the operation recognizer 102, and the operation recognizer 102 determines whether the action pattern is the correct action pattern, and determines the correctness of the operation (S402). It is also contemplated that, in this flow, in determining the correctness of the operation, the operation recognizer 102 may confirm that the time at which the action pattern was detected is preceded by the time at which the contact by the user had been detected. The control of the output controller 103 is to be carried out in the same or similar manner as in the above described control (S105).

As has been discussed in the foregoing, it is made possible in accordance with the fourth embodiment to perform the determination of the correctness not only for the operation section but also for the operation content. In addition, it is made possible to recognize in advance the error in the operation by the user in such a case where it is necessary to press an update button after completion of the operation, so that the error in the operation by the user is prevented.

(Fifth Embodiment)

In the fifth embodiment, the operation position estimation is started after the operation recognizer 102 has detected a particular action (a trigger). The processing load will increase if the operation recognizer 102 always performs the operation position estimation, the correct-answer area determination, and the correctness determination on the basis of the movement information. It may be contemplated that the user instructs the start of the operation after the user has attached the measuring device (wearable terminal), but this will lead to degradation of the usability for the user. In view of this, in accordance with the fifth embodiment, an action that the user performs prior to attempting to perform the operation is detected as the trigger, and the operation position estimation is started after the detection of the trigger, so that it is made possible to reduce the processing load of the estimation device 100.

The operation recognizer 102 is configured to detect a trigger on the basis of the movement information. The operation recognizer 102 includes a trigger detector configured to detect the trigger. It is assumed here that the operation position estimation is not performed until the trigger is detected. In addition, more than one action serving as the trigger may be defined.

As the action serving as the trigger, for example, a movement of the user attempting to contact the operation target may be contemplated.

The movement of the user attempting to contact the operation target may be defined on the basis of any parameter such as the acceleration of the finger tip's direction, velocity, and the travel distance. For example, when the action of the user extending his/her finger forward is defined as the movement of the user attempting to contact the operation target, then a case where the finger has moved with velocity equal to or larger than a predetermined value (reference value) of the finger and at least by a predetermined amount (reference value) may be defined as the action of the user extending his/her finger forward. It may also be simply defined as a case where the acceleration has exceeded a threshold. In addition, the feature quantity of the action of the user extending his/her finger may be calculated from the history of the user's actions in the past and the experiment data, and the trigger determination may be made based on the feature amount.

The threshold (reference value) for determination of the trigger may vary depending upon the users or the operations. In addition, the determined value of the movement serving as the trigger may be modified for each user or for each operation by obtaining the history of the movement serving as the trigger.

In addition, when the contact with the operation target is not recognized within a predetermined period of time after detection of the trigger, then the operation recognizer 102 may be configured to not perform the operation position estimation until the trigger is again detected.

A threshold such as acceleration for determination of the trigger may be defined in advance in the operation recognizer 102 or may be obtained via the acquirer 101.

Figure 17:
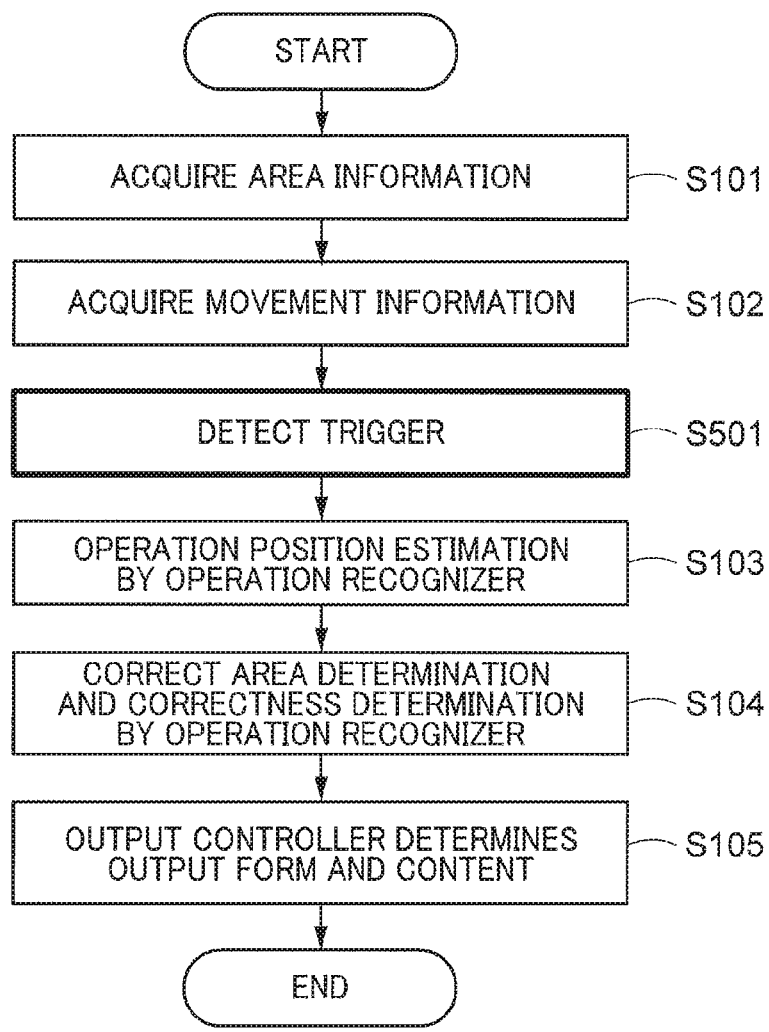
FIG. 17 is a schematic flow chart of the entire processing of the operation recognition device in accordance with the fifth embodiment.

FIG. 17 is a schematic flow chart of the entire processing of the operation recognition device 100 in accordance with the fifth embodiment. This flow chart only differs from the flow of the first embodiment in that it includes a procedure of detecting a trigger (S501) prior to the operation position estimation (S103) of the operation recognizer 102. The operation position estimation (S103) which is the subsequent procedure is not performed until the procedure of detecting the trigger (S501) is performed.

By virtue of this, the operation recognizer 102 does not need to always perform the operation position estimation, the correct-answer area determination, and the correctness determination, so that the processing load can be reduced.

In addition, the detection of the trigger may be performed by a separate trigger detector 105 (see FIG. 18) provided independently of the operation recognizer 102. Alternatively, the trigger detector 105 may detect a second trigger distinct from the first trigger recognized by the operation recognizer 102. It is also contemplated that the detection of the second trigger may be assigned to the action pattern recognizer 104 in accordance with the fourth embodiment. By virtue of this, it is made possible to reduce the energy consumption by placing the operation recognizer 102 in a low power consumption state such as a sleep state by virtue of power control function until the second trigger is detected. In other words, the operation recognizer 102 may be activated in response to the second trigger.

Figure 18:
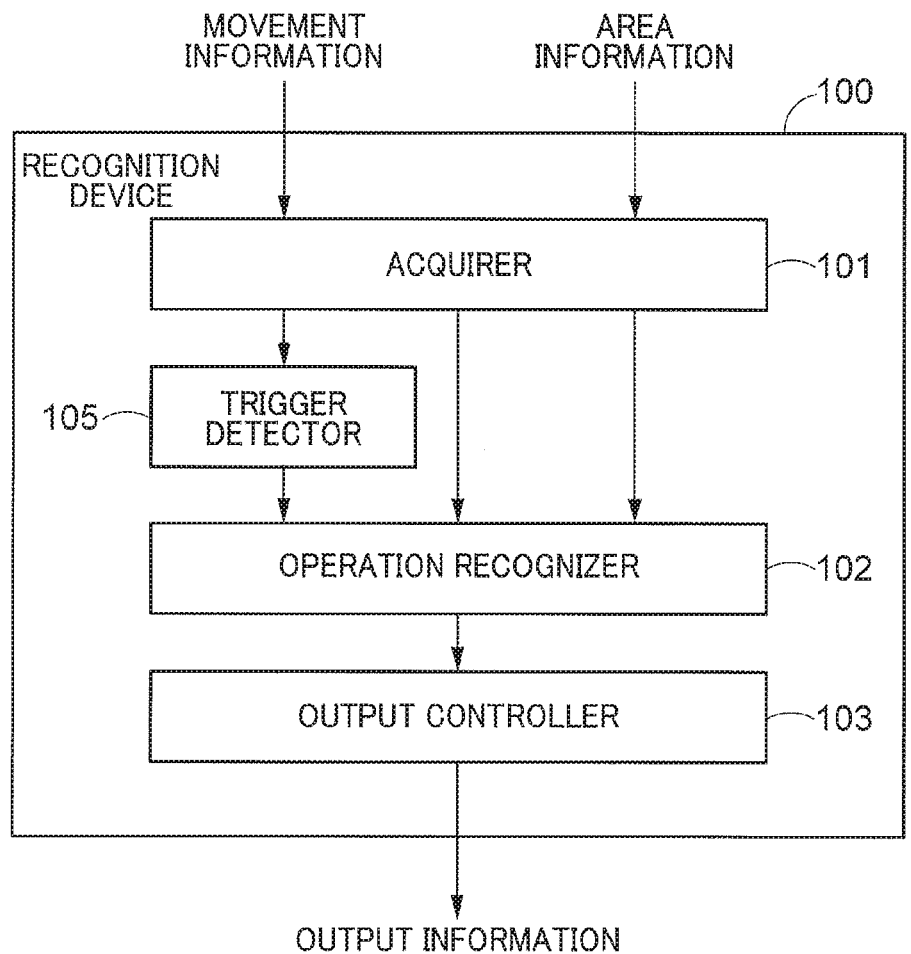
FIG. 18 is a block diagram illustrating an example of the schematic configuration of the operation recognition device 100 further including a trigger detector 105.

FIG. 18 is a block diagram illustrating an example of the schematic configuration of the operation recognition device 100 further including a trigger detector 105. The trigger detector 105 is configured to acquire the movement information from the acquirer 101 and detect an action serving as the second trigger on the basis of the movement information. The action serving as the second trigger may be defined in advance in the trigger detector 105 or may be obtained via the acquirer 101.

The second trigger may be determined as needed in the same or similar manner as the first trigger. For example, the action to be performed before the user performs the operation (a preliminary action) may be mentioned. For example, when the finger moved with an acceleration equal to or larger than a predetermined value (reference value) and with the amount of change in the angle is equal to or less than a predetermined value (reference value), then it can be said that the user intentionally moved his/her finger and it can also be understood that the user performed the preliminary action as the preliminary stage for the operation. Also, as the subsequent action, it is expected that the movement of trying to contact the operation target will be performed.

In addition, when the user always performs a predetermined action every time he/she starts the operation, then that action may be defined as the trigger. For example, when it is a predetermined routine to confirm, by pointing one's finger, the number of the operation target device and the value of the display device prior to performing an operation, then that action involving pointing by a finger may be defined as the trigger, so that it is made possible to detect that the operation is to be performed.

In addition, there may be provided a learning function that increases the accuracy of the recognition of the first trigger or the second trigger by recording the history when the first trigger and the second trigger are recognized and further recording the history of whether the expected action is subsequently actually performed so that the accuracy is increased by virtue of these histories. For example, when the movement of the user attempting to contact the operation target has been detected as the first trigger and after that the user performed the operation, then the detection may regarded as being correct and may be used as the right-answer data, and, if the user did not perform the operation, then the detection may regarded as being erroneous and may be used as the error data. It may be contemplated that the operation recognizer 102 redefines the value of the parameter such as acceleration for determining the movement of contacting the operation target from the error data and the right-answer data.

It may be contemplated that whether the operation has been actually performed may be determined using the result of the contact position determination. In addition, the operation history indicative of the past operations may be acquired from another system. The time at which the contact by the user with operation target was detected is compared with the time at which the movement of the user attempting to contact the operation target was detected, and, if there is a difference of a predetermined length of time, then the detection may be regarded as being erroneous and this detection may be utilized as the error data.

As has been discussed in the foregoing, it is made possible in accordance with the fifth embodiment to reduce the number of procedures of the operation recognizer 102. In addition, an advantage can be obtained such as reduction in the power consumption of the operation recognizer 102 by assigning the trigger detection to another unit in place of the operation recognizer 102.

(Sixth Embodiment)

The above described embodiments recognize the portion to be operated and the content of the operation in accordance with the movement of the finger or the like of the user. In a sixth embodiment, in addition to the processing that has been described in the foregoing paragraphs, the request of the user is recognized in accordance with a particular movement of the user. Specifically, when the user performs a particular movement such as a certain gesture, then the operation recognition device 100 recognizes this action and performs operation that corresponds to that action. By virtue of this, it is made possible to perform processing including display of procedure manual and voice instructions in accordance with the request of the user in the course of the operation and thus facilitate the user's operation.

In the sixth embodiment, a mode of "gesture operation mode," which is additionally provided in accordance with this embodiment, is provided along with the mode for effectuating the operations of the previous embodiments, i.e., the operation correctness determination mode for determining the correctness of the operation by the user. When the operation correctness determination mode is entered and the user performs a particular mode switching gesture for switching to the gesture operation mode, then a mode switching gesture is recognized and the mode is switched to the gesture operation mode.

Figure 19:
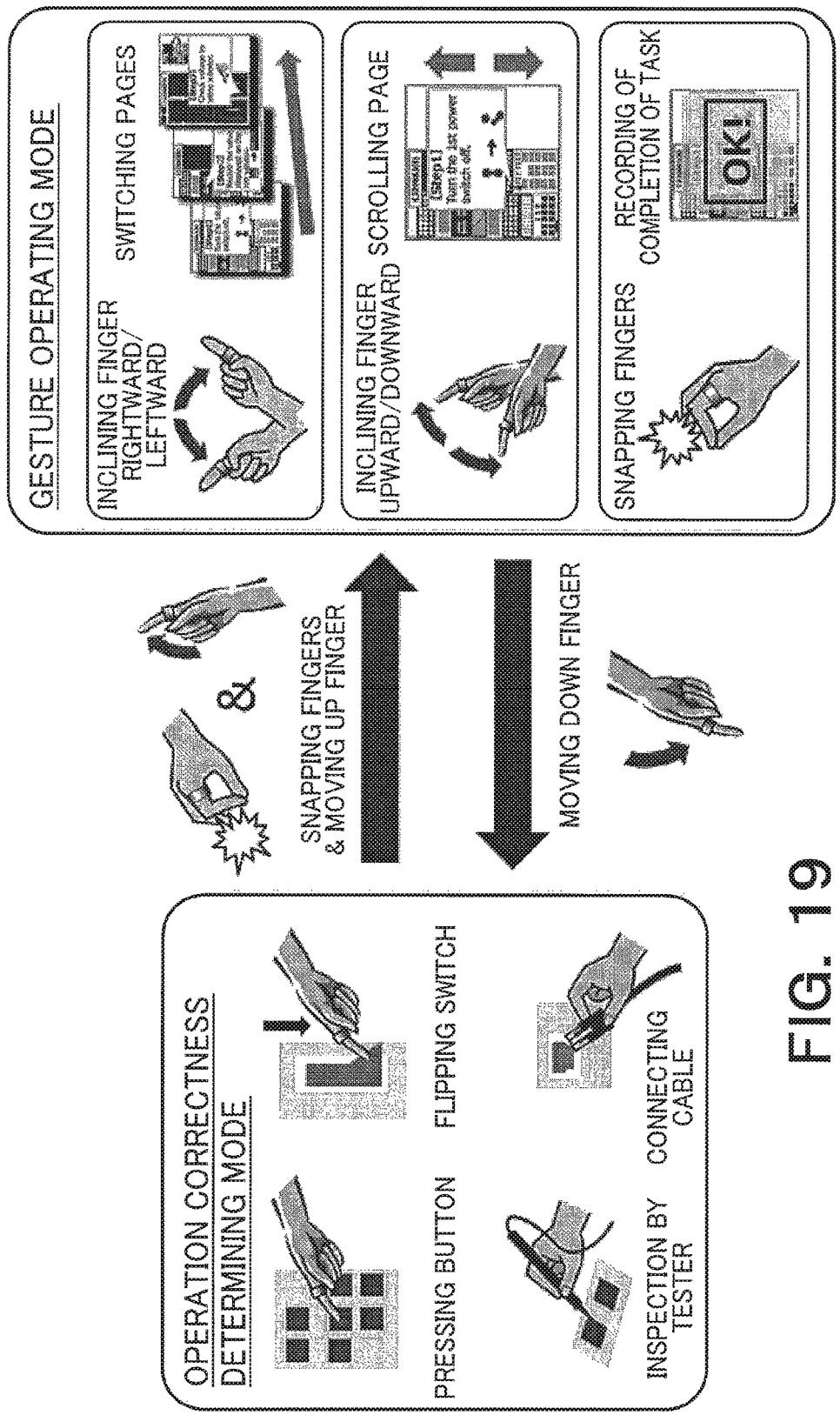
FIG. 19 is a diagram illustrating an example of a mode switching gesture.

FIG. 19 is a diagram illustrating an example of a mode switching gesture. In this figure, when the user performs a gesture of flicking fingers or moving up the finger, the modes are switched from the operation correctness determination mode to the gesture operation mode. The "finger flicking" as used herein refers to the movement of flicking a thumb and an index finger with each other. In addition, when the user performs the gesture of moving down the finger, this gesture indicates that the modes are to be switched from the gesture operation mode to the operation correctness determination mode. In this manner, different mode switching gestures may be defined corresponding to the target modes to be switched to. In addition, modes may be sequentially switched to and from each other by one single mode switching gesture. It is also contemplated that it is desirable for the mode switching gesture to be defined as an action that is not likely to be performed in the individual modes so as to ensure correct discrimination of the mode switching gestures.

It is also contemplated that the gesture operation mode may be divided into a plurality of modes in accordance with the procedures to be performed. For example, the mode may be divided into a mode for displaying the procedure manual, a mode for playing back the audio guidance of the procedure manual, a mode for recording the history of the operations that have been performed, and a mode for management of the operation recognition device 100, etc. The mode switching gestures may be individually associated with these modes.

In FIG. 19, as the gesture operations, there are illustrated a gesture of performing switching of pages of the procedure manual by inclining the finger rightward or leftward departing from a state where it is moved up, a gesture of performing page scrolling for the procedure manual by inclining the finger upward or downward, and a gesture of performing recording of the completion of the task by performing the finger flicking. It is also contemplated that the gestures are not limited to those of the fingers in the same or similar manner as in the context of the position of installation of the measuring device, and accordingly not limited to these examples. In addition, a plurality of actions performed at the same or different members such as turning one's wrist after performing the finger flicking, may be defined as the gestures. Alternatively, repetition of the same action may be defined as a gesture.

Figure 20:
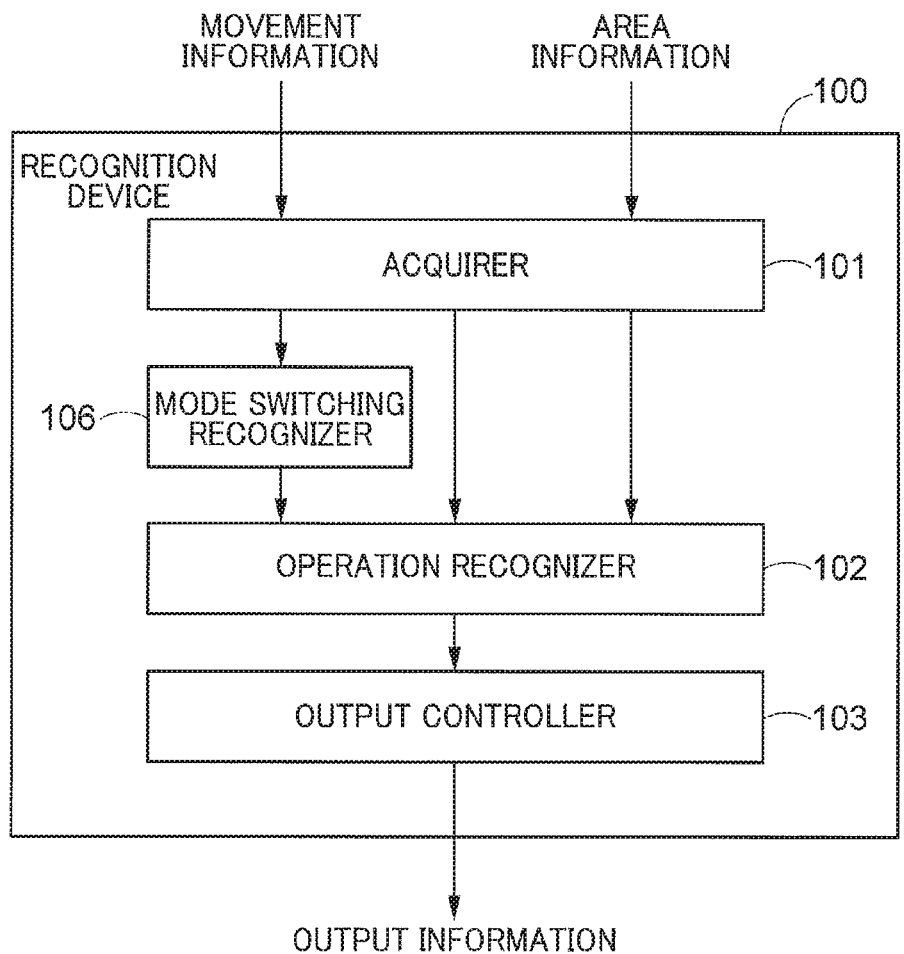
FIG. 20 is a block diagram illustrating an example of the schematic configuration of the operation recognition device in accordance with the sixth embodiment.

FIG. 20 is a block diagram illustrating an example of the schematic configuration of illustrating an example of the operation recognition device 100 in accordance with the sixth embodiment. When compared with the first embodiment, this embodiment further includes a mode switching recognizer 106.

The mode switching recognizer 106 is configured to detect the mode switching gesture from the movement information acquired by the acquirer 101. The mode switching gesture may be determined in the same or similar manner as in the processing of the action pattern recognizer 104, on the basis of the acceleration acquired in a time series manner, the inclination of the finger, or the feature quantities of them.

In addition, a gesture such as the finger flicking involving rapid change in the movement exhibits steep change in the waveform of the acceleration.

As a result, it can be detected by the pulse waveform of the acceleration illustrated in FIG. 11 as in the same or similar manner as in the case where the user contacted the operation target device.

It is contemplated that the criterion for detecting the mode switching gesture is defined in advance in the mode switching recognizer 106. In addition, it is contemplated that the administrator and the like can modify, add, and delete the mode switching gestures via the acquirer 101 in, to, or from the mode switching recognizer 106.

In addition, it is contemplated here that the mode switching recognizer 106 recognizes the mode switching gesture while the switching of the modes and the recognition of the gesture after the mode switching are performed by the operation recognizer 102, but the recognition of the gesture after the mode switching may be performed by the mode switching recognizer 106.

In addition, when the action pattern recognizer 104 or the trigger detector 105 is provided, the function of the mode switching recognizer 106 may be undertaken by the action pattern recognizer 104 or the trigger detector 105.

When the operation recognizer 102 is notified of the detection of the mode switching gesture from the mode switching recognizer 106, then the operation recognizer 102 switches the operation modes. In addition, when the determination of whether it is the switching gesture is performed by the operation recognizer 102, the feature quantity that has been sent from the mode switching recognizer 106 may be compared with the feature quantity of the mode switching gesture, and thus the similarity is calculated. When the similarity is equal to or larger than a threshold, it is determined to be the mode switching operation, so that the mode may be switched to the gesture operation mode.

It is also contemplated that the operation recognizer 102 may revoke the determination result at the time of recognizing the gesture for switching to the gesture operation mode even when the determination to the effect that the operation is erroneous has been made in the mode of determining the correctness of the operation.

In the gesture operation mode, the operation recognizer 102 performs the gesture recognition instead of the operation position estimation. As the gesture recognition, in the same or similar manner as in the action pattern recognition, the acceleration that has been acquired in a time series manner, the inclination of the finger, or the feature quantities of them is calculated and whether the movement of the user is a predetermined particular gesture is determined. It is also contemplated that since the operation position estimation is not performed in the gesture operation mode, a flag, for example, indicative of the fact that the gesture operation mode is entered may be enabled, and the gesture determination may be performed in place of the operation error determination while this flag is enabled.

When the operation recognizer 102 has recognized the mode switching gesture in the gesture operation mode, the operation recognizer 102 may cancel the flag to the effect that the gesture operation mode is entered and resume the operation position estimation without relying upon the mode switching recognizer 106. In this case, the mode switching recognizer 106 may pause the processing until it receives the notification of switching to the operation correctness determination mode from the operation recognizer 102.

When the output controller 103 is notified of cancellation of the operation correctness determination result and switching to the gesture operation mode, the output controller 103 cancels the control that has been carried out up to that time and carries out another control that corresponds to the gesture operation mode. For example, it carries out the control including displaying procedure manual, displaying the menu of the audio guidance, etc.

As has been discussed in the foregoing, it is made possible in accordance with the sixth embodiment for the user, who has been provided with the information from the operation recognition device 100, to request the operation recognition device 100 to provide him/her with the information and to actively confirm the operation section and the content of the operation, so that user assistance of higher quality can be provided.

(Seventh Embodiment)

In the above described embodiments, the change in the angle of the finger of the user is recognized on the basis of the movement information that is measured by the measuring device, and thus the operation position estimation is performed. In accordance with a seventh embodiment, an image of a camera is further used to perform the operation position estimation.

The configuration of this embodiment is the same as that of the first embodiment.

The acquirer 101 acquires an image captured by an image capturing device. It is contemplated that the operation section by the user is contained in the image. In addition, a video may be used as the image. The image capturing device is not limited to a particular configuration. It may be a three-dimensional camera having a depth sensor or the like.

The camera may be installed near the operation target device or may be attached to the user or mounted to the user's belongings. For example, it may be mounted to eyeglasses or a helmet worn by the user, or may be carried by the user himself/herself so that he/she hangs it from his/her neck.

The operation recognizer 102 performs, in the same or similar manner as in the above described embodiments, the operation position estimation, but in this embodiment, the operation position estimation is performed by further using the image that the acquirer 101 acquires. For example, the position and the scale of the finger or the like of the user is recognized using geometrical information of the operation target, the operation area, the correct-answer area, etc. obtained from the acquirer 101 and using geometrical information of the corresponding portion within the image, and estimates the operation position.

Figure 21:
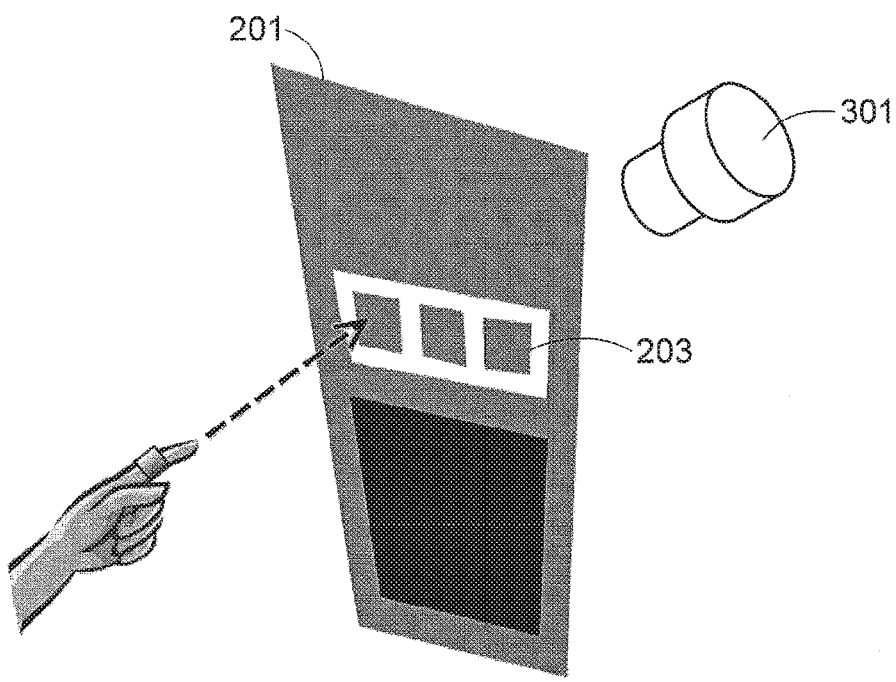
FIG. 21 is a diagram illustrating a method of operation position estimation in accordance with a seventh embodiment.

FIG. 21 is a diagram illustrating a method of operation position estimation in accordance with a seventh embodiment. There is provided a camera 301 installed above the contact target device, and it is contemplated that the camera 301 is capable of capturing the image of the operation of the user. In FIG. 21, the user is attempting to perform the operation for the button 203 of the operation target device 201, in which context it is contemplated that the starting position of the movement of the finger by which the user attempts to perform the operation and the button 203 are included in the image of the camera 301. The image of the camera 301 is sent to the acquirer 101.

After the operation target has been identified, the operation recognizer 102 estimates the angle and the position of the camera 301 on the basis of the dimensions of the actual operation target included in the area information and the size of the operation target contained in the image of the camera 301. In place of the operation target, the estimation may be made from the individual operation components of the operation target or any other item. A seal or the like for recognizing the size may be attached to the operation target. The angle and the position of the camera 301 can be calculated from the scale of the size of each side of the operation target or the operation components with respect to the size of the corresponding portion contained in the image of the camera 301, or the state of distortion of the target device within the image.

The operation recognizer 102 calculates the moving speed and the moving direction of the finger on the basis of the accumulated changes in the movement information. At the same time, it is capable of recognizing the finger within the image of the camera 301 and thus calculates the moving speed with respect to the moving direction components of the finger within the image.

The approximate distance between the finger and the camera and their relative positions are identified by the relationship between the calculated moving speed and the moving speed within the image of the camera 301. In addition, the approximate distance or the relative position with respect to the operation target or the operation area will be revealed. By virtue of this, it is made possible to estimate the position at which the finger starts its movement. On the basis of this position of start of movement and the calculated moving direction, it is made possible to estimate the operation position and the contact position.

It is also contemplated that these parameters recognized by the image may be specified as values having a predetermined range, in relation to which the operation position, etc. may be represented by the likelihood distribution.

In addition, the contact position may be identified by the image. The operation recognizer 102 identifies the time at which the user contacted the operation target and contact position of the user can be identified from the image information at that time.

As discussed in the foregoing, it is made possible in accordance with the seventh embodiment to estimate the operation position without being affected by the distance between the user and the operation target or the posture of the standard state.

The individual procedures in the above described embodiments can be effectuated by software (program). Accordingly, the operation recognition device in accordance with the above described embodiments can be effectuated, for example, by using a schematic purpose computer device as the basic hardware and making a CPU (processor) incorporated in the computer device execute the program, or using circuitry.

Figure 22:
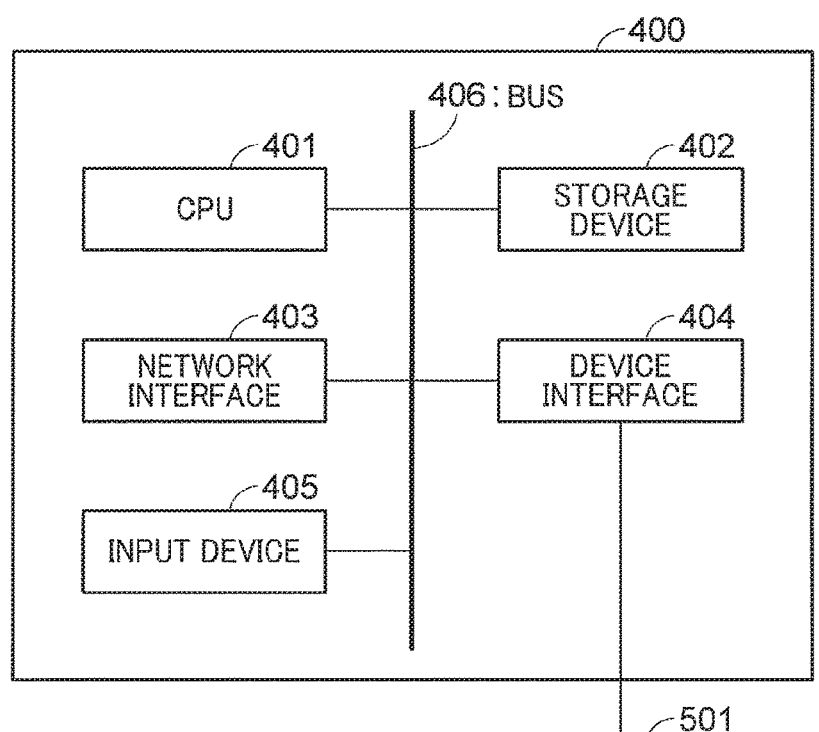
FIG. 22 is a block diagram illustrating an example of a hardware configuration in accordance with one embodiment of the present invention.

FIG. 22 is a block diagram illustrating an example of a hardware configuration in accordance with one embodiment of the present invention. The operation recognition device 100 includes a CPU 401, a storage device 402, a network interface 403, a device interface 404, and an input device 405 and can be effectuated as a computer device 400 where these elements are interconnected via a bus 406.

The CPU 401 is a control device and arithmetic device of the computer device 400. The CPU 401 performs arithmetic processing on the basis of the data input from the individual devices (for example, the primary storage device 402, the network interface 403, and the input device 406) connected thereto via the bus 406 as well as the programs, and the results of the arithmetic operation and control signals are output to the individual devices (for example, the storage device 402, the network interface 403, and the device interface 404) connected thereto via the bus 406.

Specifically, the CPU 401 executes an OS (operating system) of the computer device 400 and a program (recognition program) that implements the processing of each embodiment, and controls the individual devices configuring the computer device 400. The recognition program refers to a program for implementing on the computer device 400 each of the above described functional features of the recognition device. The CPU 401 executes the recognition program and thus the computer device 400 is allowed to function as the operation recognition device 100.

The storage device 402 is a storage medium for storing the OS of the computer device 400, the recognition program, data necessary for execution of the recognition program, and data generated by the execution of the recognition program. The storage device 402 includes a primary storage device and an external storage device.

The primary storage device may be, for example and not limited to, RAM, DRAM, and SRAM. The storage device 402 is capable of storing movement data obtained from the acceleration information sensor, etc., area information obtained from the database, etc., and results of estimation of the operation recognizer 102.

The network interface 403 is a device configured for the computer device 400 to perform wired or wireless communications with an external device. The network interface 403 may be, for example and not limited to, a modem, a hub, and a router. Movement data obtained from the acceleration information sensor, etc., and the area information obtained from a database, etc. can be obtained via the network interface 403. In addition, the information for the output control of the output controller 103 may be transmitted to an external communication device via the network interface 403.

The device interface 404 is connected to an external device 501. The external device 501 may be an external storage device. The external storage device may be, and not limited to, a hard disk, an optical disk, flash memory, and a magnetic tape. In addition, the external device 501 may be an output device that is controlled by the output controller 103. It may be, for example and not limited to, an LCD (liquid crystal display), a CRT (cathode-ray tube), a touch panel, and a PDP (plasma display). In addition, the output device may be an output device for management of the computer device 400. For example, it may display the information such as sensor data of a sensor including an acceleration sensor, the sensor data being acquired by the acquirer 101.

The input device 405 is a device for inputting information in the computer device 400. The input device 405 may include, but not limited to, for example, a keyboard, a mouse, and a touch panel.

It is also contemplated that the computer device 400 includes one or more of the CPU 401, the storage device 402, the network interface 403, the device interface 404, and the input device 405. In addition, they may be connected to peripheral devices such as a printer and a scanner via the device interface 404.

In addition, the recognition device may be configured by one single computer or may be configured as a system that includes a plurality of computers that are connected to each other.

Further, the recognition program may be stored in advance in the storage device 402, stored in a storage medium such as CD-ROM, or uploaded on the Internet. In either case, the recognition device can be configured by installing the recognition program in the computer device 400 and executing the installed recognition program.

FIGS. 23 to 27 are diagrams each illustrating an example of a system configuration in accordance with one embodiment of the present invention.

Figure 23:
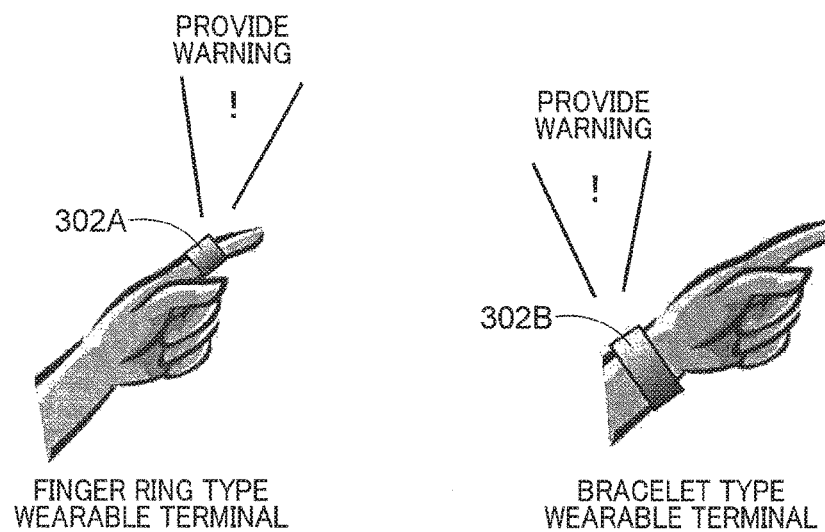
FIG. 23 is a diagram illustrating an example of a system configuration in a case where the hardware in accordance with one embodiment of the present invention is included in a wearable terminal.

FIG. 23 is a diagram illustrating an example of a system configuration in a case where the hardware in accordance with one embodiment of the present invention is included in a wearable terminal. The finger ring type wearable terminal 302A and the bracelet type wearable terminal 302B, which are illustrated as examples of the wearable device, include an acquirer such as an acceleration sensor configured to acquire the movement information, the hardware, and an outputter configured to output light, sound, vibration, etc. Also, when an error in the user's operation has been detected, the outputter provides a warning for the user by light, sound, vibration, etc. in accordance with the instruction of the output controller 103.

Figure 24:
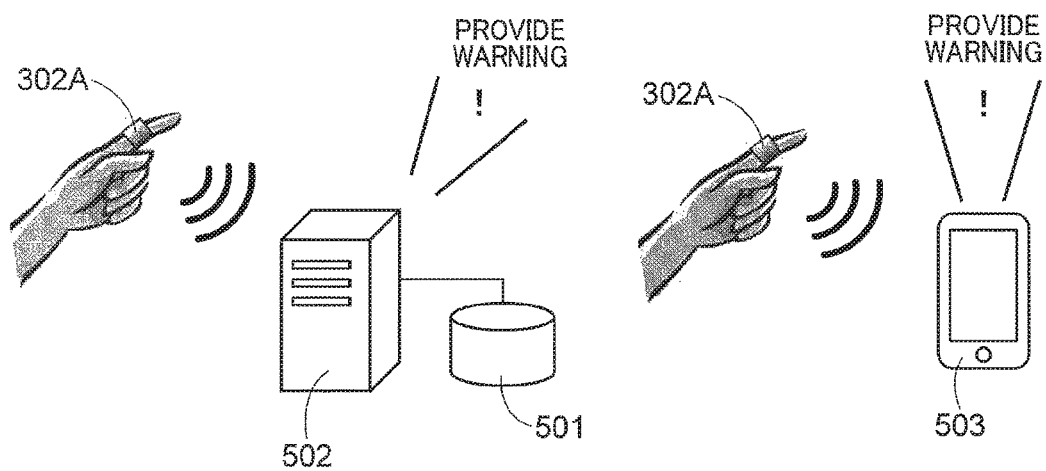
FIG. 24 is a diagram illustrating an example of a system configuration in a case where the hardware in accordance with one embodiment of the present invention is effectuated by an external device of a wearable terminal.

FIG. 24 is a diagram illustrating an example of a system configuration in a case where the hardware in accordance with one embodiment of the present invention is effectuated by an external device of a wearable terminal. The server 502 and the mobile terminal 503, which are illustrated as examples of the external device, includes the hardware and an outputter configured to output light, sound, vibration, etc. It is also contemplated that the external device 501 is connected to the server 502. The server 502 and the mobile terminal 503 obtain the movement information sent from the wearable terminal via the network interface 403. Also, when an error in the user's operation has been detected, the outputter provides a warning for the user by light, sound, vibration, etc. in accordance with the instruction of the output controller 103.

Figure 25:
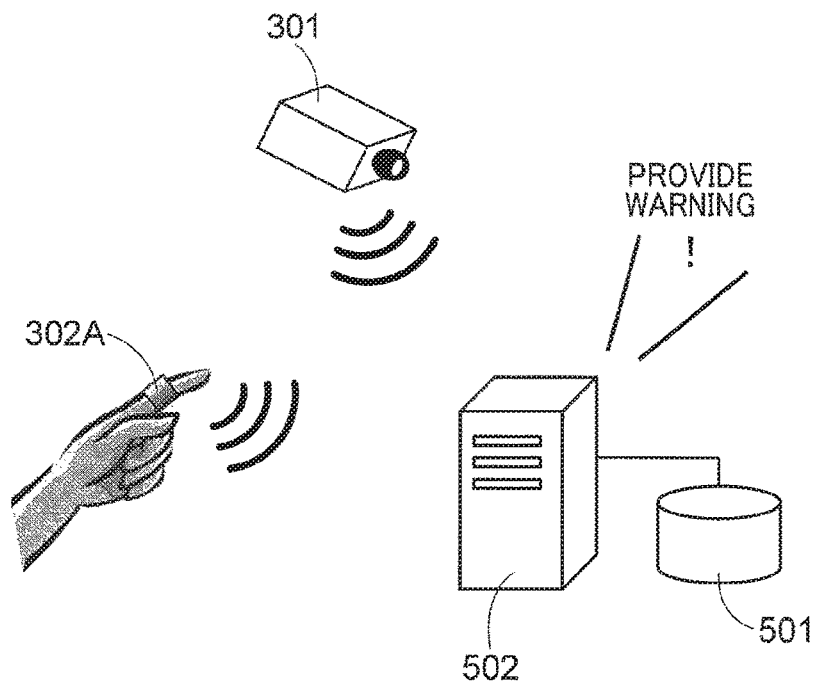
FIG. 25 is a diagram illustrating an example of a system configuration in which a camera is included.

FIG. 25 is a diagram illustrating an example of a system configuration in which a camera is included. The camera 301 may be a monitoring camera installed near the operation target device 201, or a Web camera mounted to a helmet, eye glasses, etc. of the user. The camera 301 sends an image that allows for recognition of the position or the like of the user to the server 502. In addition, the wearable terminal sends the movement information to the server 502. The server 502, by virtue of this image, recognizes with higher accuracy the position at which the user attempts to perform the operation than in a case where the image is not available. Also, when the error in the operation by the user has been detected, an outputter of the server 502 provides a warning for the user.

Figure 26:
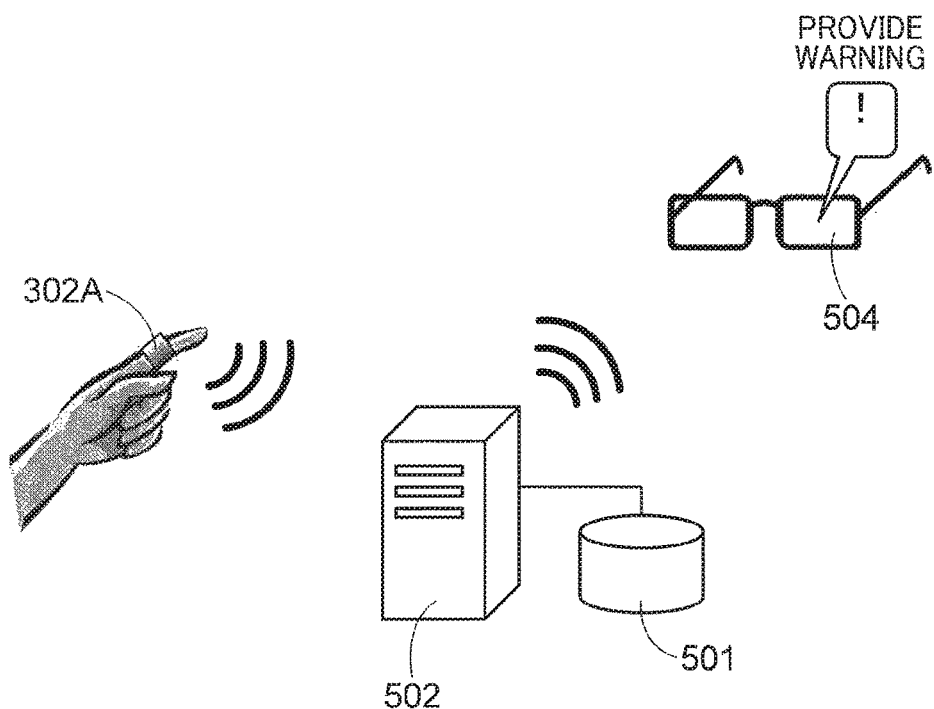
FIG. 26 is a diagram illustrating an example of a system configuration in a case where the external device of the hardware in accordance with one embodiment of the present invention outputs a warning.

FIG. 26 is a diagram illustrating an example of a system configuration in a case where the external device of the hardware in accordance with one embodiment of the present invention outputs a warning. The eyeglass type display 504, which is illustrated as the device adapted for outputting the warning, includes an outputter adapted to output visual information such as an image. The outputter of the eyeglass type display 504 provides the warning for the user in accordance with the instruction of the output controller 103 sent via the network interface 403. The visual information may be superposed upon the actual view seen by the user via the eyeglasses. It is also contemplated that the device that is made to output it may be identical with the device for acquiring the movement information.

Figure 27:
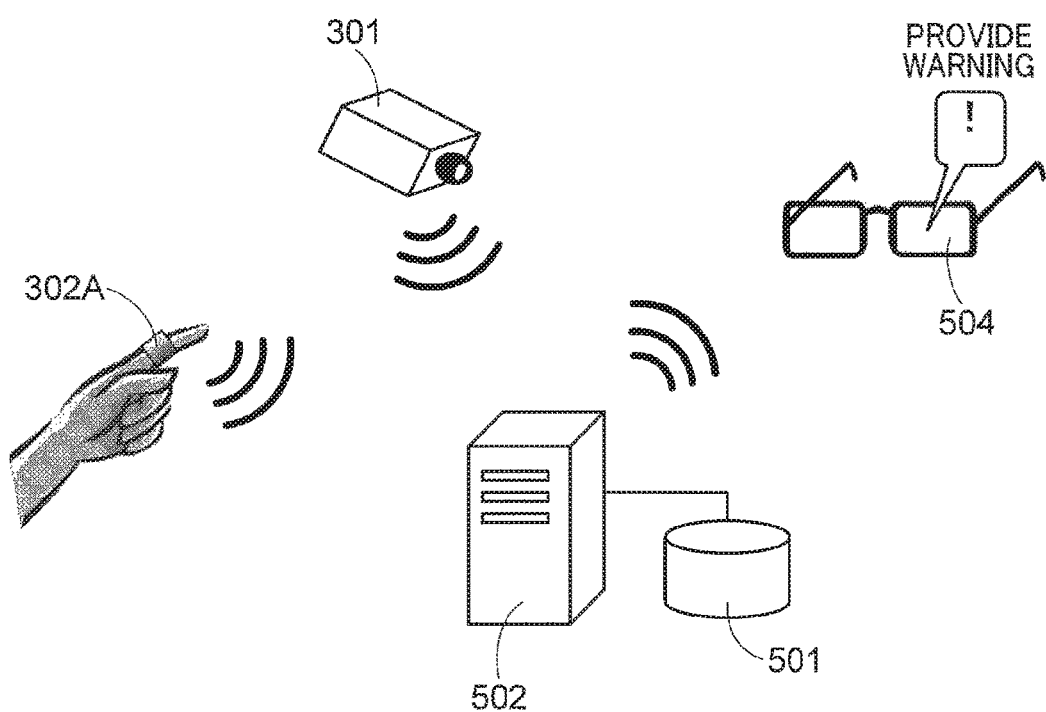
FIG. 27 is a diagram illustrating an example of a system configuration in a case where a camera is included and an external device of the hardware in accordance with one embodiment of the present invention outputs a warning.

FIG. 27 is a diagram illustrating an example of a system configuration in a case where a camera is included and an external device of the hardware in accordance with one embodiment of the present invention outputs a warning. The configurations and operations of the individual component devices are the same as in the other systems.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An operation recognition device comprising a computer including a hardware processor:
   the hardware processor programmed to:
      acquire movement information associated with a movement of a user;
      acquire area information corresponding to a first operation section;
      determine, based at least in part on the movement information and the area information corresponding to the first operation section, an estimated position corresponding to a subsequent operation by the user; and
      determine whether the subsequent operation by the user is directed to the first operation section based at least in part on the estimated position corresponding to the subsequent operation.

2. The operation recognition device according to claim 1, wherein the first operation section is a part of a target device which is a subject to operation by a user.

3. The operation recognition device according to claim 1, wherein the movement information is acquired by at least one of an acceleration sensor, an angular velocity sensor, or a geomagnetism sensor.

4. The operation recognition device according to according to claim 1, wherein determining whether the subsequent operation by the user is directed to the first operation section is based at least in part on a positional relationship between the estimated position and the area information corresponding to the first operation section.

5. The operation recognition device according to claim 4, wherein the hardware processor is further programmed to:
calculate a likelihood of the user performing an operation with respect to the first operation section based at least in part on a positional relationship between the estimated position and an area of the first operation section; and
determine that the subsequent operation by the user is directed to the first operation section when the likelihood is equal to or larger than a particular threshold.

6. The operation recognition device according to claim 5, wherein the hardware processor is further configured to:
determine that the subsequent operation by the user is not directed to the first operation section when the likelihood is less than the particular threshold, and
generate an output signal based at least in part on a result of the determination.

7. The operation recognition device according to claim 5, wherein
the area information includes area information corresponding to one of a second to Nth operation sections that are different than the first operation section where N is an integer equal to or larger than two,
the hardware processor is further programmed to:
estimate an area including the position to which a subsequent operation by the user corresponds; and
calculate first to Nth likelihoods of the user performing an operation with respect to the first to Nth operation sections in accordance with degrees of overlap between the estimated area and areas of the first to Nth operation sections; and
determine whether the subsequent operation by the user is directed to the first operation section based at least in part on the first to Nth likelihoods.

8. The operation recognition device according to claim 7, wherein the hardware processor is further programmed to:
calculate probability density information for each of a plurality of positions within the estimated area, the probability density information being indicative of a probability of the user performing an operation at each position; and
calculate the first to Nth likelihoods using the probability density information.

9. The operation recognition device according to claim 8, wherein the movement information includes acceleration information relating to an acceleration of the user, and the hardware processor is further programmed to:
recognize that the user has interacted with an operation target based at least in part on the acceleration information,
calculate an area with which the user interacted based at least in part on the movement information, and
determine whether the user has interacted with the first operation section based at least in part on a relationship between the calculated area and the area of the first operation section.

10. The operation recognition device according to claim 9, wherein the area information includes area information on a second operation section, the second operation section being a subsequent operation target after the user has interacted with the first operation section, and the hardware processor is further programmed to determine whether the subsequent operation by the user is directed to the second operation section after determining whether the user has interacted with the first operation section.

11. The operation recognition device according to claim 9, wherein the hardware processor is further programmed to update the probability density information based at least in part on the information corresponding to the area with which the user interacted.

12. The operation recognition device according to claim 9, wherein the hardware processor is further programmed to determine whether the user has interacted with the first operation section without determining whether the subsequent operation by the user is directed to the first operation section.

13. The operation recognition device according to claim 9, wherein the hardware processor is further programmed to determine whether the user has performed a first operation with respect to the first operation section based at least in part on the movement information and a first reference value in a case that the hardware processor has recognized that the user has interacted with the operation target.

14. The operation recognition device according to claim 7, wherein the hardware processor does not determine whether the subsequent operation by the user is directed to the first operation section in a case that at least part of the estimated area does not overlap with any one of the areas of the first to Nth operation sections.

15. The operation recognition device according to claim 1, wherein the hardware processor is further programmed to detect, based at least in part on the movement information and a second reference value, a second action serving as a trigger before the user interacts with the first operation section,
wherein the hardware processor starts estimating the position to which a subsequent operation by the user corresponds after the second action has been detected.

16. The operation recognition device according to claim 15, wherein the hardware processor does not estimate the position to which the subsequent operation by the user corresponds prior to the second action being detected.

17. The operation recognition device according to claim 15, wherein the hardware processor is further programmed to update the second reference value in accordance with a result of determining whether the subsequent operation by the user is directed to the first operation section.

18. The operation recognition device according to claim 1, wherein the operation recognition device has at least two operating modes including a first mode that determines whether the subsequent operation by the user is directed to the first operation section, and a second mode that performs different actions than that in the first mode in accordance with an action of the user, and the hardware processor is further configured to switch operating modes based at least in part on the movement information.

19. The operation recognition device according to claim 1, wherein the hardware processor is further programmed to:

acquire image information associated with the user and the first operation section; and recognize a distance between the user and the first operation section or relative positions of the user and the first operation section with respect to each other based at least in part on the movement information, the area information, or the image information.

20. The operation recognition device according to claim 1, wherein the movement associated with the movement information is a movement before the user contacts the target device.

21. An operation recognition method comprising:

acquiring movement information associated with a movement of a user;

acquiring area information corresponding to a first operation section;

determining, based at least in part on the movement information and the area information corresponding to the first operation section, an estimated position corresponding to a subsequent operation by the user; and determining whether the subsequent operation by the user is directed to the first operation section based at least in part on the estimated position corresponding to the subsequent operation.

\* \* \* \* \*